United States Patent
Kai et al.

(10) Patent No.: US 7,546,043 B2
(45) Date of Patent: Jun. 9, 2009

(54) OPTICAL COMMUNICATION SYSTEM

(75) Inventors: Yutaka Kai, Kawasaki (JP); Hideyuki Miyata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 10/785,483

(22) Filed: Feb. 25, 2004

(65) Prior Publication Data

US 2004/0179840 A1  Sep. 16, 2004

(30) Foreign Application Priority Data

Feb. 27, 2003  (JP)  ............................. 2003-051740

(51) Int. Cl.
*H04B 10/06*  (2006.01)
(52) U.S. Cl. ..................................... 398/213
(58) Field of Classification Search ................. 398/213
See application file for complete search history.

(56) References Cited

U.S. PATENT DOCUMENTS

| | | | |
|---|---|---|---|
| 5,552,919 A * | 9/1996 | Majima et al. .............. 398/213 |
| 6,262,822 B1 | 7/2001 | Obhi et al. |
| 6,351,323 B1 | 2/2002 | Onaka et al. |
| 6,407,376 B1 | 6/2002 | Korn et al. |
| 6,441,933 B1 | 8/2002 | Jang |
| 6,597,480 B1 * | 7/2003 | Iida et al. ....................... 398/79 |
| 6,748,179 B2 | 6/2004 | Lange et al. |
| 6,845,108 B1 | 1/2005 | Liu et al. |
| 6,888,856 B2 | 5/2005 | Green et al. |
| 7,024,116 B2 | 4/2006 | Orbach et al. |
| 7,292,787 B1 | 11/2007 | Kai et al. |
| 2002/0030868 A1 * | 3/2002 | Salomaa ..................... 359/124 |
| 2002/0101633 A1 | 8/2002 | Onaka et al. |
| 2002/0118459 A1 | 8/2002 | Kuznetsov |
| 2002/0126348 A1 | 9/2002 | Lange et al. |
| 2003/0007522 A1 | 1/2003 | Li et al. |
| 2003/0133649 A1 * | 7/2003 | Hakimi et al. ................ 385/24 |
| 2003/0202190 A1 | 10/2003 | Atia et al. |

(Continued)

FOREIGN PATENT DOCUMENTS

JP  4-166909  6/1992

(Continued)

OTHER PUBLICATIONS

Communication—European Search Report for European Application No. 04004430.7-2415- dated Jun. 16, 2006.

(Continued)

*Primary Examiner*—Leslie Pascal
(74) *Attorney, Agent, or Firm*—Staas & Halsey LLP

(57) ABSTRACT

Signal light with a specific wavelength is transmitted and extracted from signal light multiplexed by a WDM method, and a light detection unit detects the signal light detected by an optical tunable filter, whose wavelength transmission characteristic varies depending on a control signal. An operation circuit generates information for designating a control signal needed to enable the optical tunable filter to extract signal light with a designated wavelength, based on the detected results of two segments of signal light located at each edge of a wavelength band obtained by shifting the wavelength transmission characteristic of the optical tunable filter from outside the wavelength band including all segments of the entire WDM signal. A driving circuit generates a control signal according to the designation information.

16 Claims, 18 Drawing Sheets

U.S. PATENT DOCUMENTS

2004/0091002 A1    5/2004   Watterson et al.
2004/0197099 A1*  10/2004   Kai et al. ...................... 398/85
2006/0193354 A1    8/2006   Rosenblatt

FOREIGN PATENT DOCUMENTS

| JP | 6-102555    | 4/1994  |
|----|-------------|---------|
| JP | 8-288932    | 11/1996 |
| JP | 9-261206    | 10/1997 |
| JP | 11-218790   | 8/1999  |
| JP | 11-289296   | 10/1999 |
| JP | 2000-241782 | 9/2000  |
| JP | 2000-349713 | 12/2000 |
| JP | 2001-284711 | 10/2001 |
| JP | 2003-344817 | 12/2003 |

OTHER PUBLICATIONS

Communication—Partial European Search Report for European Application No. 04004430.7-2415- dated Apr. 19, 2006.

European Patent Office Action, dated Sep. 29, 2006, and issued in related European Patent Application No. 04 004 430.7—2415.

Japanese Patent Office Notice of Rejection Grounds, mailed Mar. 18, 2008 and issued in corresponding Japanese Patent Application No. 2003-051740.

* cited by examiner

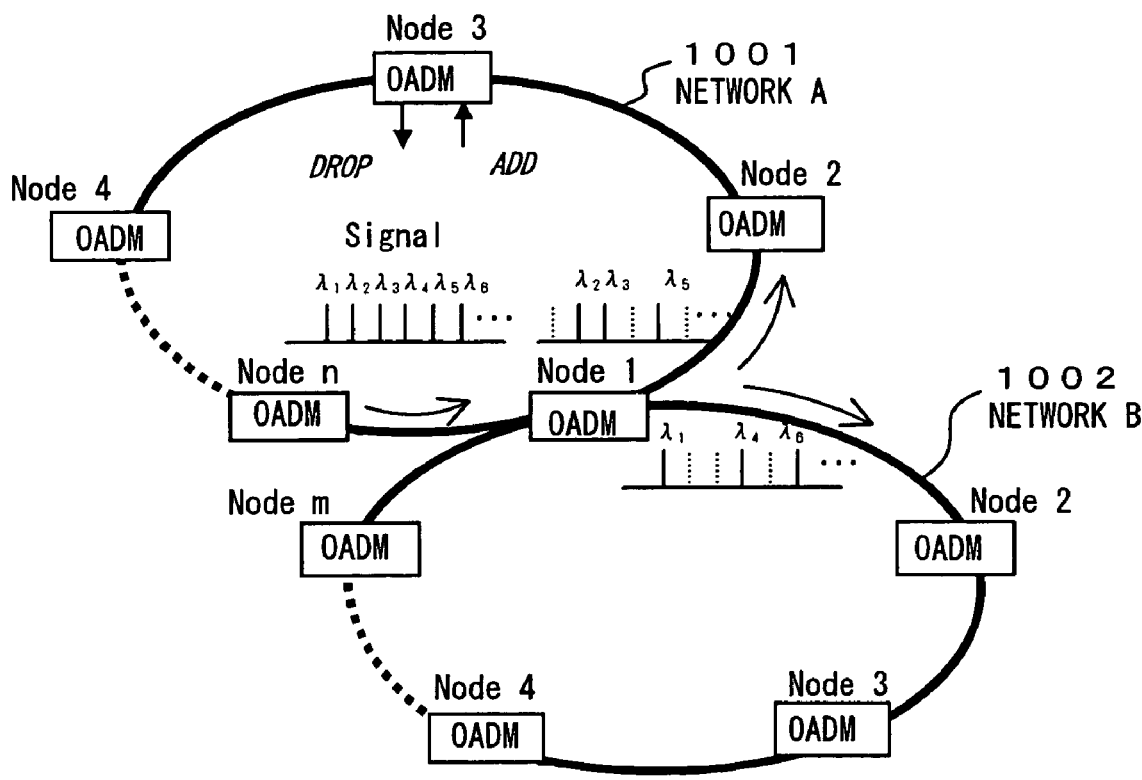
F I G. 1  P R I O R  A R T

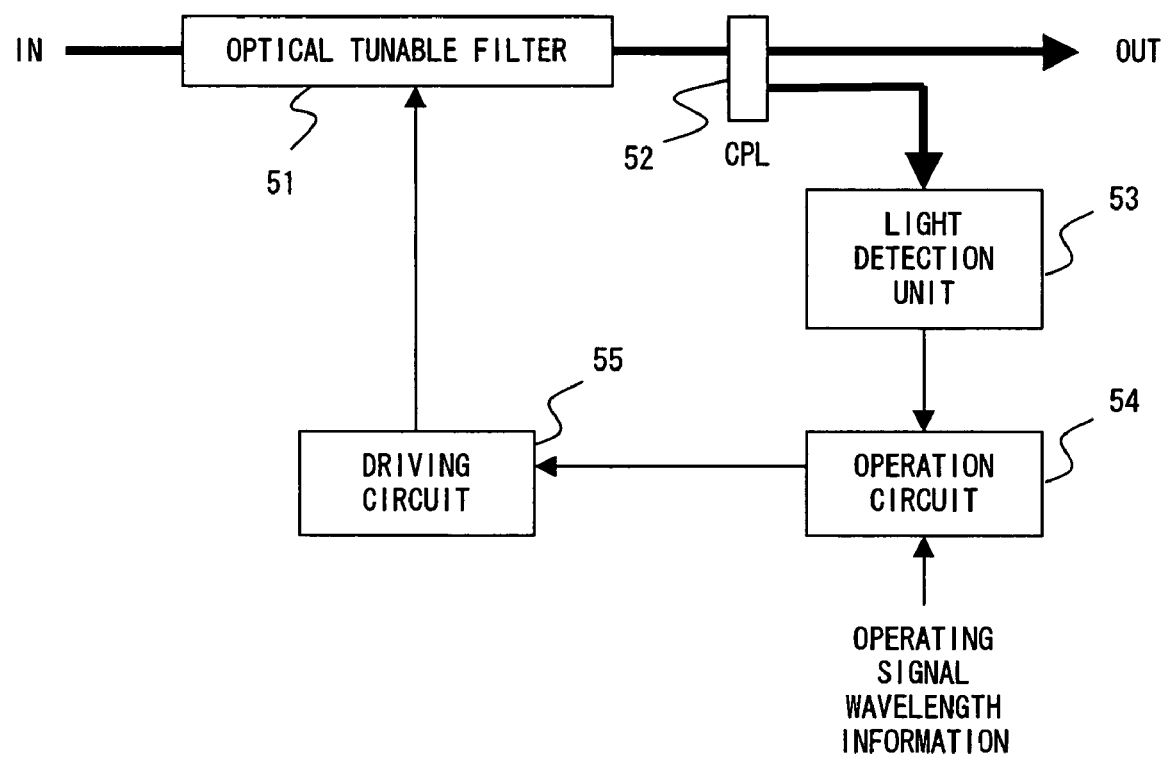
F I G. 5

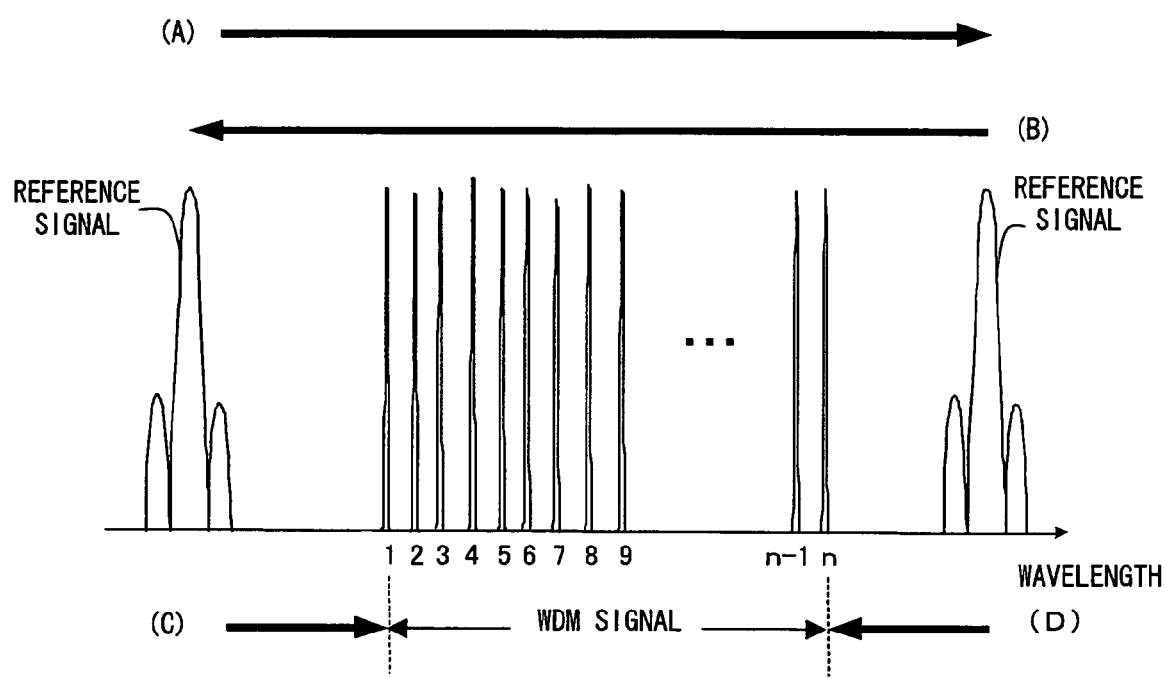
F I G. 7

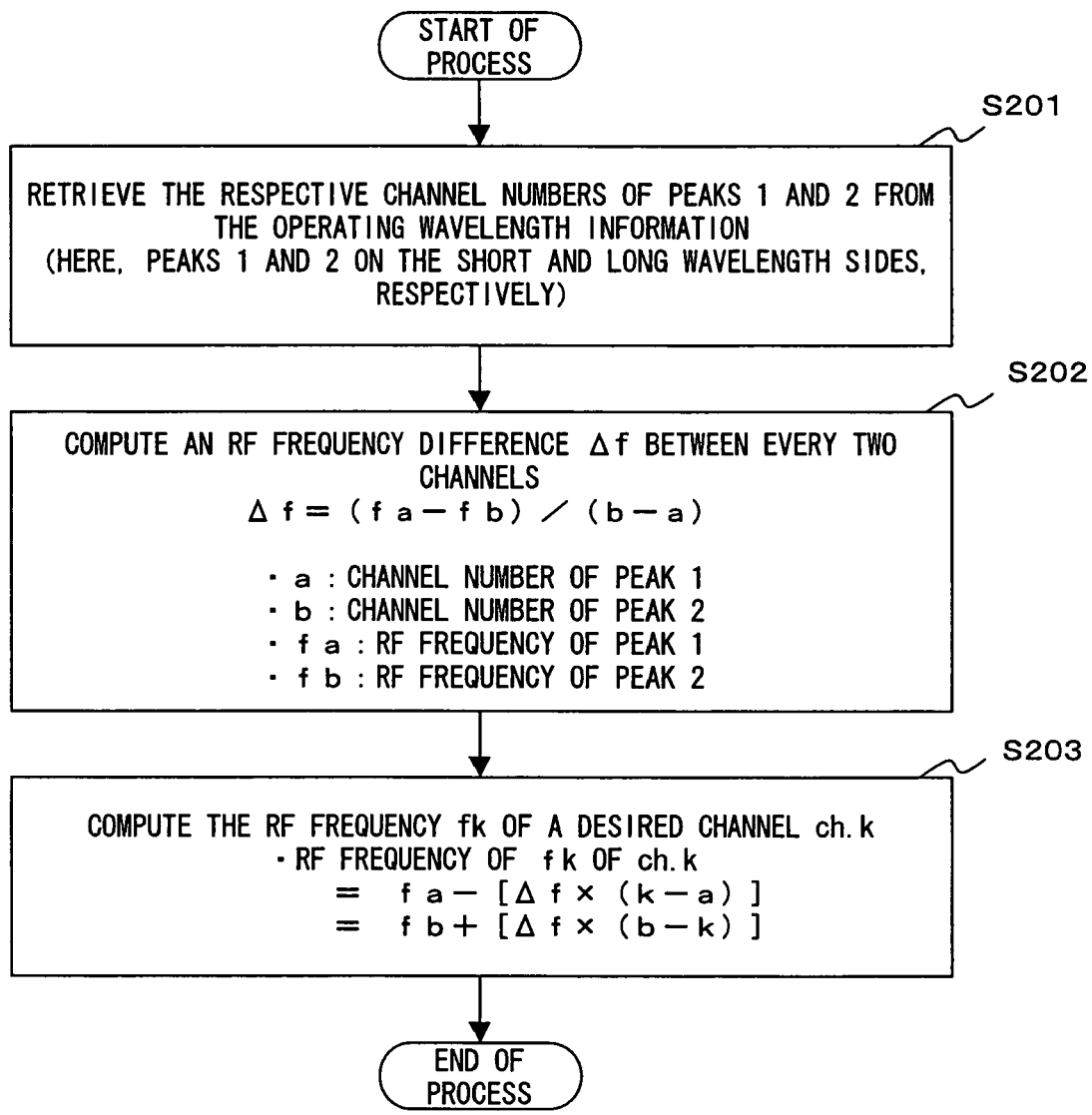
F I G. 8

F I G. 1 1 A    FULL WIDTH AT HALF MAXIMUM  0.1 nm, FINESSE 8
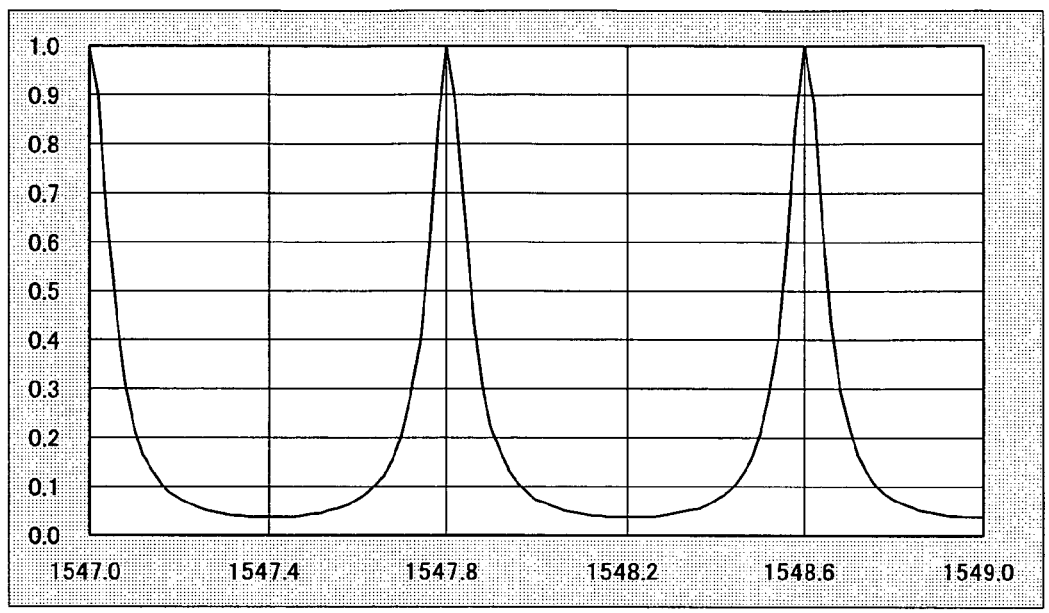
F I G. 1 1 B    FULL WIDTH AT HALF MAXIMUM  0.3 nm, FINESSE 2.67
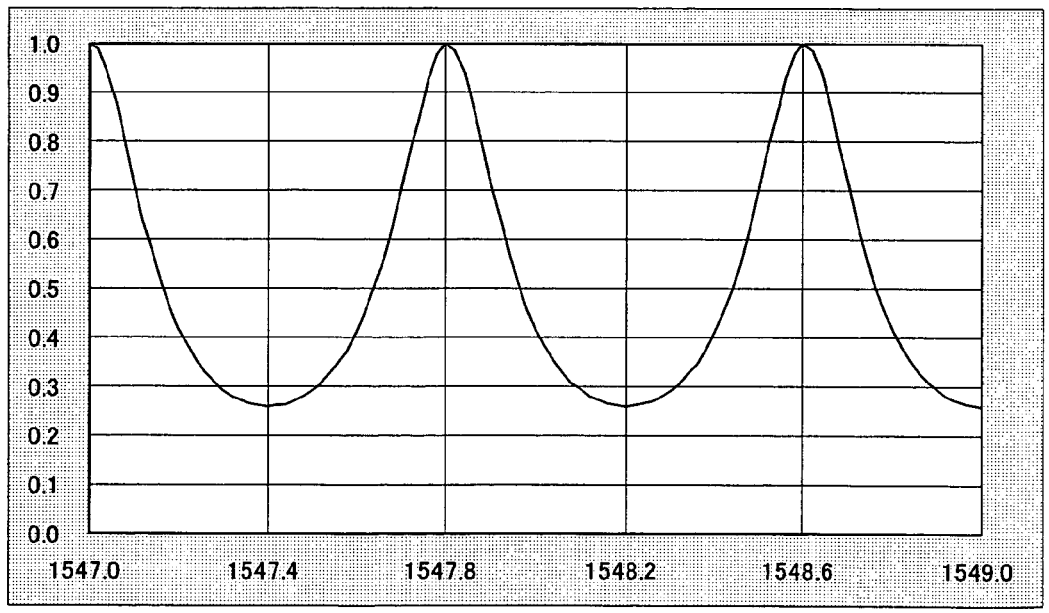

F I G. 1 2 A  FULL WIDTH AT HALF MAXIMUM 0.05 nm, FINESSE 15.95
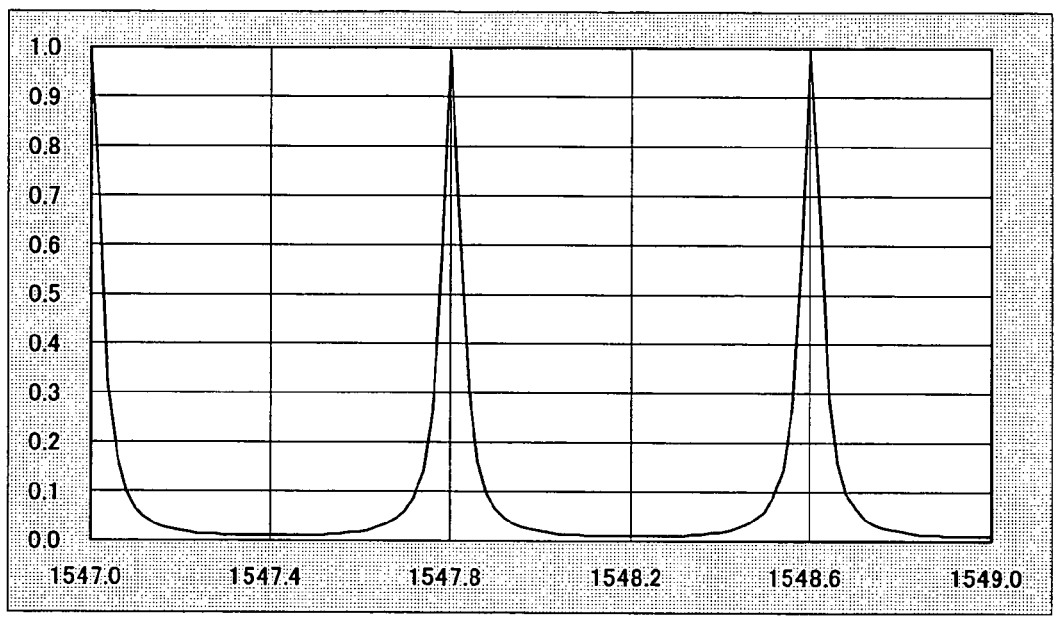
F I G. 1 2 B  FULL WIDTH AT HALF MAXIMUM 0.5nm, FINESSE 1.889
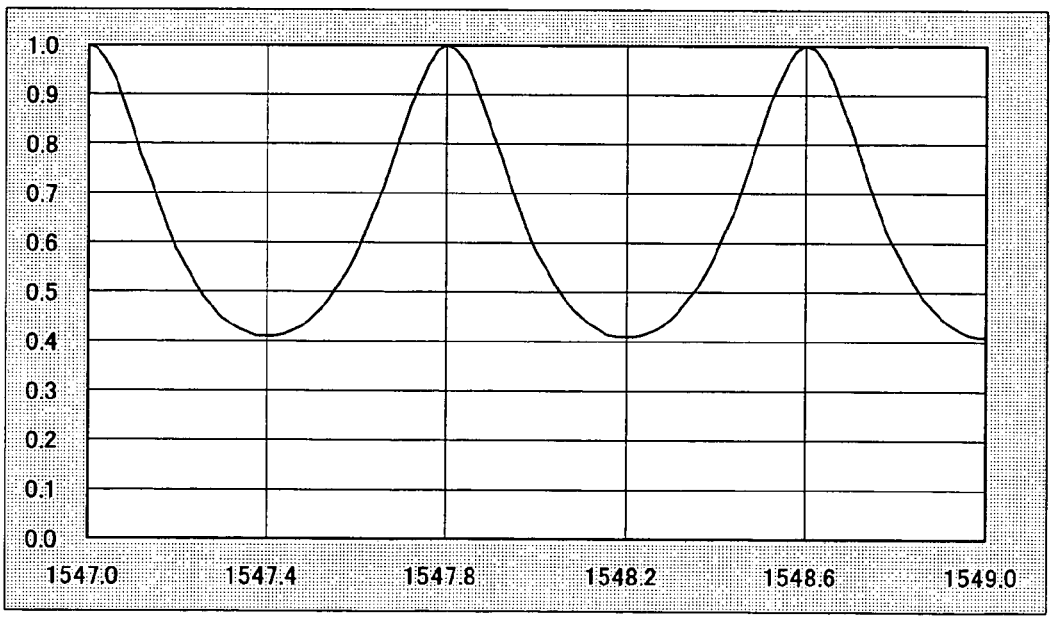

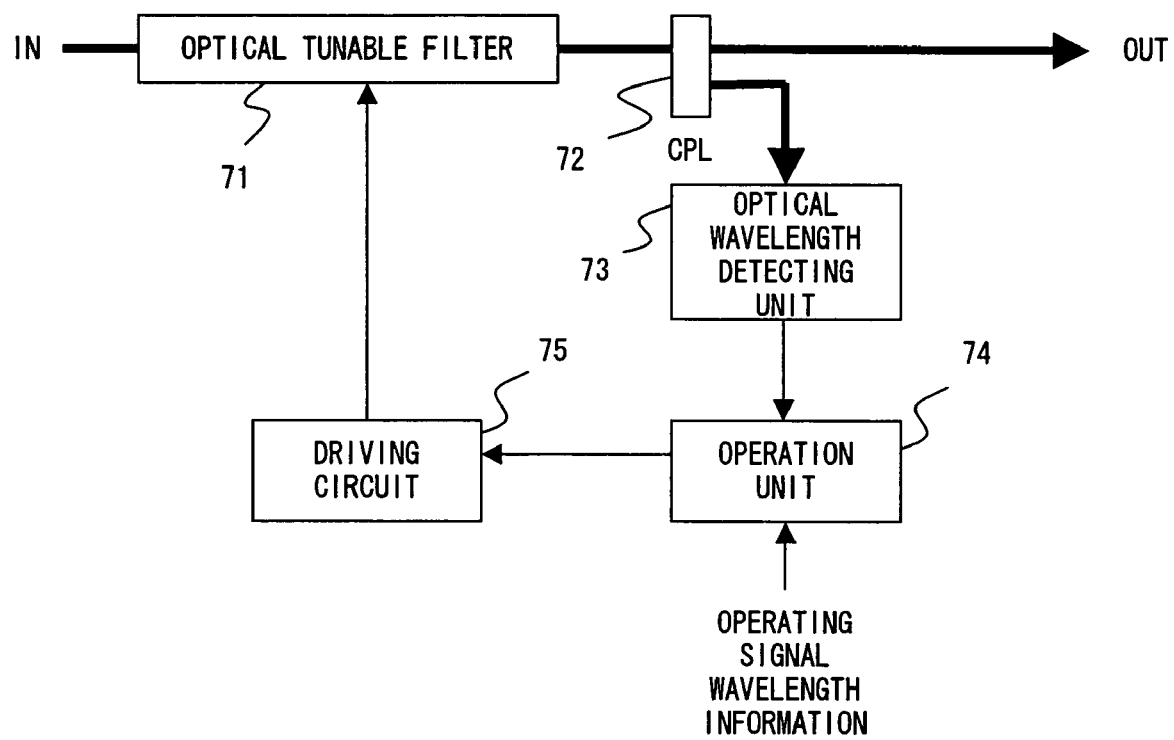
F I G. 1 3

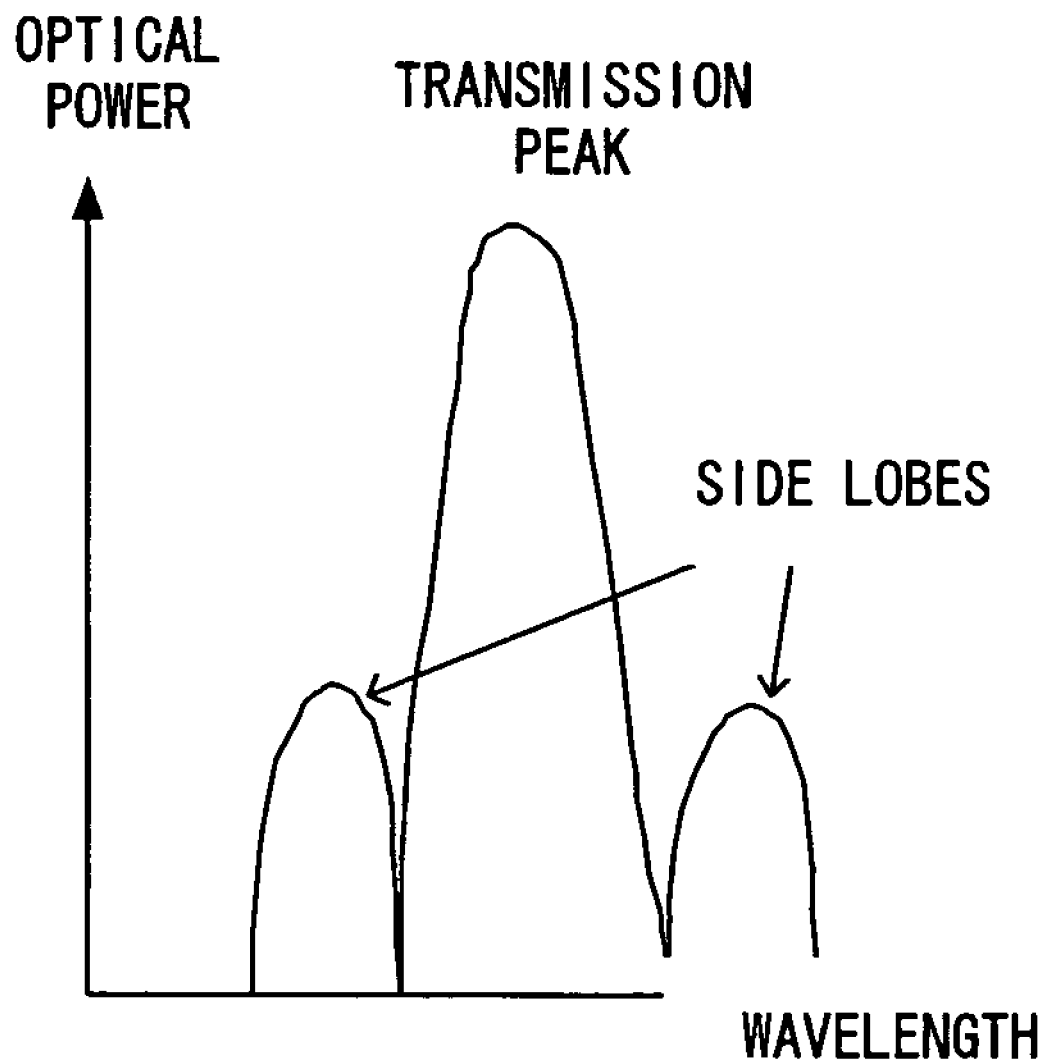
F I G. 1 4

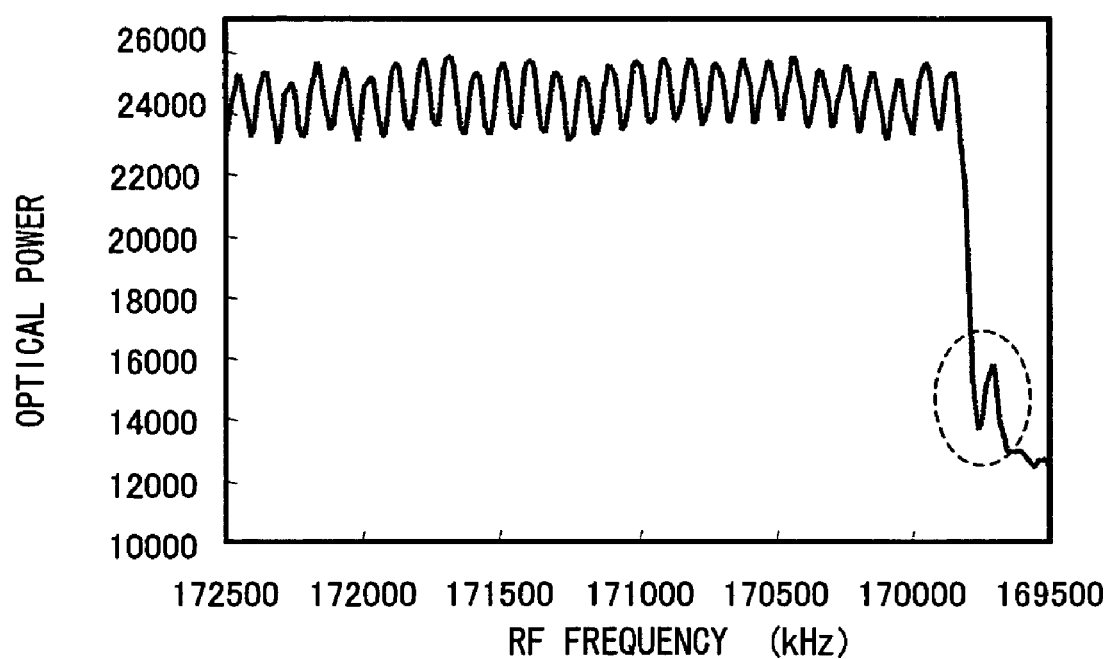
F I G. 1 5

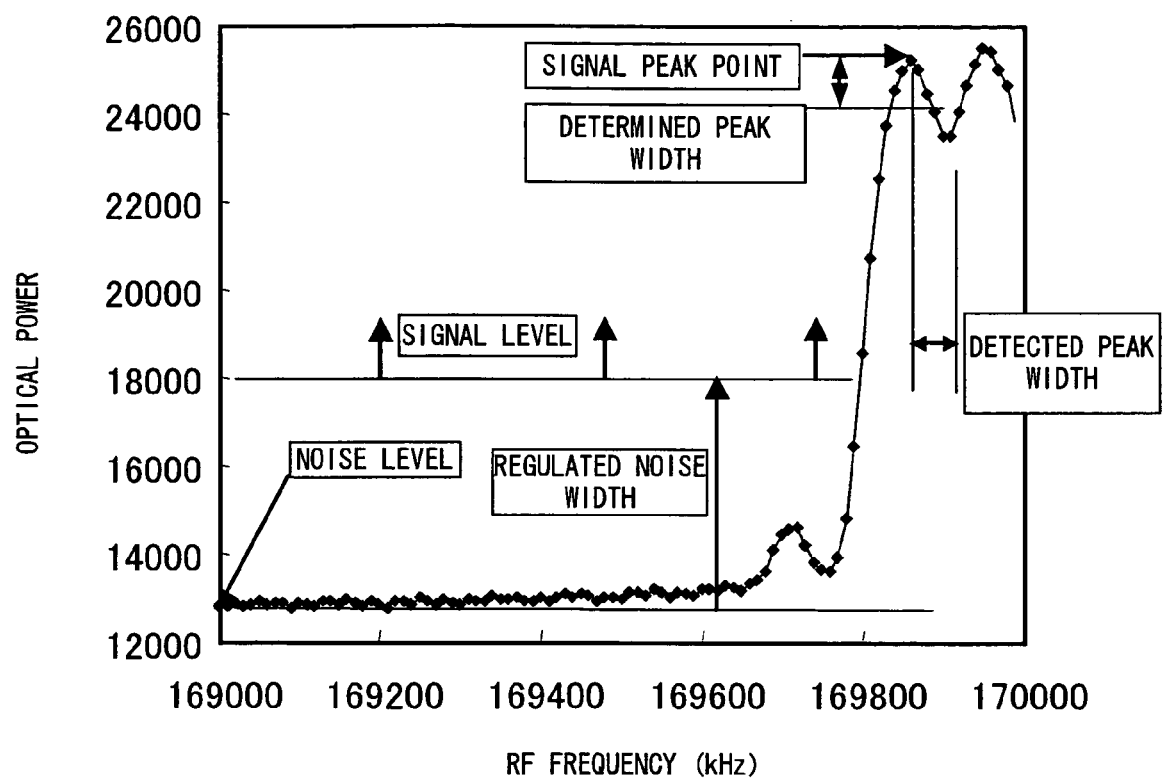
F I G. 1 6

OPTICAL COMMUNICATION SYSTEM

BACKGROUND OF THE INVENTION

1. Field of the Invention

The present invention relates to a WDM (wavelength-division multiplexing) optical communication technology and particularly it relates to a technology for controlling an optical tunable filter needed to extract signal light with a specific wavelength from a plurality of segments of signal light multiplexed by a WDM method, each with a different wavelength.

2. Description of the Related Art

With the explosive increase of a data communication demand centered on Internet traffic, a large capacity and super-long haul backbone network is required. Since in that case, a variety of user services are required, the realization of a high-reliable, flexible and economical network is also required.

By the progress of a wavelength-division multiplexing transmission technology and an optical amplification technology, recently transmission capacity and transmission distance have been remarkably increased and transmission line cost has also been reduced. However, if a conventional optical/electric conversion system or a electric switching system is adopted in order to follow a high-speed and large capacity signal and to increase the information processing capability of a network node, a node cost increases and the size of a node device also increases. In such a background, the development of an optical add drop multiplexer (OADM) and an optical cross connect (OXC) device, which replaces a large-scale electronic circuit with an optical device in an optical communication system in order to reduce the cost and size of a node and performs a variety of processes of data in units of an optical path in an optical wavelength area, is expected.

In these devices, a lot of optical function devices, such as an optical switch for turning signal light on/off, attenuating signal light and performing the 1×n switching of signal light, etc., a wavelength filter for distributing signal light for each wavelength and the like are used.

Of these optical function devices, an optical wavelength selecting device (hereinafter in this specification, called an "optical tunable filter") that can select signal light with a desired wavelength from a WDM signal is a major key device for realizing an OADM. Such an optical tunable filter includes an acousto-optic tunable filter (AOTF).

FIG. 1 shows a network configuration of an OADM node, and FIG. 2 shows a configuration of an OADM using an AOTF.

In FIG. 1, a network A, 1001 and a network B, 1002 are overlapped in node 1, and the OADM of node 1 drops three segments of signal light each with one of wavelengths $\lambda_1$, $\lambda_4$ and $\lambda_6$ of WDM signal light consisting of six segments of signal light each with one of wavelengths $\lambda_1$ through $\lambda_6$ transmitted from the node n in network A, 1001, from network A, 1001 and transmits them to the node 2 of network B, 1002. Three segments of signal light each with one of wavelengths $\lambda_2$, $\lambda_3$ and $\lambda_5$ are transmitted through the OADM to the node 2 of network A, 1001.

The network shown in FIG. 2 is a ring network. The network comprises a running system (working system, indicated as system W), which is actually used, and a stand-by system (protection system, indicated as system P), which is used when system W fails. Since the respective configurations of systems W and P are the same, only the configuration of system W is described here. Although system W shown in FIG. 2 comprises three OADMs of OADM 1(W), OADM 2 (W) and OADM 3 (W), they have the same configuration. Therefore, only the configuration of OADM 1 (W) is described here. An amplified spontaneous emission (ASE) suppression filter 2000 inserted in the middle of system W or P eliminates natural light noise (white noise) generated and accumulated by each amplifier existing in the ring network.

WDM signal light transmitted to OADM1 (W) from OADM3 (W) is amplified up to a predetermined size by an amplifier 2001, and then is inputted to a photo-coupler (CPL) 2002. Although the signal light transmitted through the CPL 2002 is inputted to a rejection AOTF 2003, part of signal light demultiplexed by the CPL 2002 is inputted to an amplifier 2004. The signal light amplified by the amplifier 2004 is demultiplexed into a plurality of segments of signal light by a CPL 2005, and each demultiplexed are inputted to a drop AOTF 2006. The drop AOTF 2006 extracts signal light with a desired wavelength from the WDM signal light. The extracted signal light is designated as the drop output of the OADM 1 (W).

Then, this signal light from this OADM 1(W) is transmitted through an optical switch (OSW) 2100 for switching a system from W to P or vice versa, is inputted to a transponder 2200 and is demodulated.

The signal (ADD input signal) transmitted to the network from this node is, firstly, optically modulated by a tunable transponder 2300 to signal light with a predetermined wavelength. Then, the signal is inputted to the OADM 1 (W) through an OSW 2400. This signal light is multiplexed with signal light with a different wavelength transmitted from the node by a CPL 2007. The signal light multiplexed by the CPL 2007 is amplified up to a predetermined size by an amplifier 2008 and is inputted to a CPL 2009. Then, the signal light is inserted in the signal light transmitted without being blocked by the rejection AOTF 2003 of the signal light from the OADM 3 (W), and both are multiplexed. The signal light multiplexed by the CPL 2009 is amplified up to a predetermined size by an amplifier 2010 and then is transmitted toward the OADM 2 (W).

The signal light wavelength selecting characteristic of the rejection AOFT 2003 and the drop AOTF 2006 is controlled by a control unit (MC) 2011, based on information provided by a monitoring control system 3000 monitoring the operation of the entire network shown in FIG. 2.

As described above, an OADM node must have a function to insert (ADD) signal light with a desired wavelength in light that is transmitted through a node, a function to drop (extract) signal light with a desired wavelength from light that is transmitted through a node and a function to block signal light transmitted through a node. A function to collectively drop signal light sometimes is needed. This function is required in a node where two or more ring networks or general networks are overlapped, and is used to transmit signal light consisting of a plurality of segments of signal light each with a different wavelength from one network to another network. A function to collectively block signal light is also sometimes needed. This function blocks signal light with a wavelength to be terminated of light transmitting through a node and a plurality of segments of signal light each with a wavelength that has the same wavelength element.

In an OADM node, it is important for signal light with an arbitrary wavelength to be able to be demultiplexed and inserted for the purpose of the flexible operation of a network. For that purpose, it is necessary to apply the above-mentioned collective process to signal light with an arbitrary wavelength, and from this point of view, a device, such as an AOTF having a function to freely change a wavelength to be selected is useful. If signal light with a desired wavelength is selected and demultiplexed using this function to freely change a wavelength to be selected, the transmission center of the filtering characteristic of such a device must completely coincide with the desired wavelength of signal light. If the transmission center wavelength does not coincide with a signal light wavelength, for example, in the drop (extraction) process, insertion loss increases or signal light with another wavelength is wrongly dropped, which is the fatal problem of an OADM device.

Generally, the wavelength of light emitted from a laser diode (LD), being a transmitting light source, fluctuates, and the transmission center wavelength of such a device that provides a filter characteristic also fluctuates due to a change with an elapse of time, an environmental change, a control error and the like. Therefore, in order to stabilize the operation of an OADM device, it is indispensable to detect a wavelength fluctuation error and to track it to perform feedback control. In this tracking, in the case of a drop process, dropped signal light is demultiplexed and designated as monitor light, the monitor light is detected and its power value is controlled in such a way as to become a maximum. Usually, for example, a method for controlling by checking only the size of the receiving optical power of the monitor light, which is disclosed by Japanese Patent Laid-open No. 8-288932, is most economical and efficient.

However, since an AOTF has a selected wavelength fluctuation characteristic that is sensitive to ambient temperature, for example, a temperature change of only 1° C. leads to a100 GHz difference in a selected wavelength, the optimal frequency of an RF (high frequency) signal to be applied to determine a wavelength to be selected is not uniquely related to the wavelength to be selected and a wavelength to be selected varies due to fluctuations in ambient temperature. For example, although an AOTF selects a wavelength of 1,550 nm if an RF signal of 170 MHz is applied at ambient temperature of 25° C., it selects a wavelength of 1,558 nm if the same RF signal of 170 MHz is applied at ambient temperature of 35° C. Since the optimal frequency of an RF signal to be applied to an AOTF varies depending on ambient temperature, the AOTF sometimes wrongly selects signal light with a different wavelength in the selection of a signal with one arbitrary wavelength from a WDM signal.

If an optical power value supplied to a light detection unit detecting monitor light is small, the amount of fluctuation in a signal to be detected for tracking control also becomes small. Therefore, it is difficult to control tracking. Furthermore, the fact that since the amplitude of a signal to be detected becomes relatively small when setting in advance a wide dynamic range to avoid the saturation states of a photodiode and an amplifier, an S/N (signal-to-noise) ratio degrades, the degradation of detection accuracy due to the fluctuations of another wavelength close to a dithering frequency and the like also become factors for difficult tracking control.

Regarding the above-mentioned problem, the applicant of the present invention has also previously applied for a patent with a method providing the light detection unit with a logarithmic amplifier, as shown in FIGS. 3A and 3B, to the Japanese Patent Office (Japanese Patent Application No. 2002-149555). This method is briefly described below.

FIG. 3A shows the configuration of a light detection circuit using a logarithmic amplifier.

In FIG. 3A, the current value of a monitor optical signal is converted into a size corresponding to its optical power value by a photo-diode (PD) 4001. This current value is inputted to the current/voltage conversion logarithmic amplifier 4002 which has the input/output characteristic shown in FIG. 3B, and is converted into a logarithmic voltage value. Then, this voltage value is amplified by a non-inversion amplifier 4003. Then, the high-wavelength element of the voltage value is eliminated by transmitting the value through a low-pass filter (LPF) 4004, and is inputted to an A/D converter 4005. Then, a digital signal corresponding to an input voltage value is outputted. This digital signal is transmitted to a driving circuit generating a RF signal to be applied to the AOTF as information for determining the optimal frequency of the RF signal.

In tracking control, the change of a transmitting optical power is observed and controlled by slightly changing a wavelength to be selected in the AOTF. However, if a logarithmic amplifier is used, as shown in FIG. 3B, a control signal is observed to change at a constant ratio against an input power in a logarithmic scale. Therefore, it can be easily controlled.

If the above-mentioned method for providing the light detection unit detecting monitor light with a logarithmic amplifier is adopted for the tracking control of the AOTF, the logarithmic amplifier outputs a voltage in a logarithmic scale. Therefore, a change in a large input signal is observed as a small change and a change in a small input signal is observed as a large change. Therefore, even a change in a very little optical power area that can never be observed can be observed. More specifically, for example, if there is a change of 10 dB in an input power area of −40 dBm, which cannot be signal light at all, even the output value of nearly zero measured in the light detection unit, not adopting a logarithmic amplifier that slightly changes, can be observed as it is in the light detection unit using a logarithmic amplifier. Therefore, such very little signal light is sometimes wrongly recognized as an actual WDM input signal.

In reality, since in a WDM system, a gain tilt is generated by the wavelength dependence of the amplification factor of an optical amplifier, a technology called "pre-emphasis" for transmitting a transmitting power after giving a tilt the reversal of that of the optical amplifier to it on a transmitting side is used. In a very high-speed and long-haul transmission system, since a gain tilt compensator is provided, a wavelength-transmitting power spectrum characteristic can be freely set. In other words, since there is a system in which the power spectrum of a WDM signal is not uniform and varies depending on a wavelength, for example, it is difficult to distinguish a very small change in a WDM signal composed of the remaining elements of a WDM signal obtained after it is cut and removed by an AWG (arrayed waveguide grating) or a filter from a WDM signal to which a tilt is given. Therefore, when selecting one segment of signal light with an arbitrary wavelength from the WDM signal, channel signal light with a different wavelength is sometimes wrongly selected.

SUMMARY OF THE INVENTION

It is an object of the present invention to provide a method for controlling an optical tunable filter so as not to wrongly select a signal with a different wavelength when selecting the signal with a desired wavelength from a wavelength division multiplexed (WDM) signal using the optical tunable filter.

In one aspect of the present invention, the optical communication system comprises an optical tunable filter which transmits and extracts only a signal with a specific wavelength of a signal multiplexed by a wavelength division multiplexing (WDM) method and whose wavelength transmission characteristic varies depending on a control signal, a detection unit detecting signal light extracted by the optical tunable filter, and a control signal generating unit generating a control signal needed to enable the optical tunable filter to extract signal light with a desired wavelength, based on the detected result obtained when the detection unit shifts the wavelength transmission characteristic of the optical tunable filter in a wavelength band including all segments of the multiplexed signal light.

According to this configuration, since a control signal to be applied to an optical tunable filter to extract each multiplexed signal light is known for each signal light, the wrong extraction of a signal with a different wavelength is prevented when extracting a signal with a desired wavelength.

In the above-mentioned optical communication system, the control signal generating unit can also generate a control signal needed to extract signal light with a desired wavelength, based on the detected result and information indicating the current operating situation of the multiplexed signal light.

Since the current situation of the multiplexed signal light is known thus, a control signal to be applied to the optical tunable filter to extract each multiplexed signal light can be obtained for each signal light even if there is a channel lost due to non-operation in the wavelength band of the multiplexed signal light.

In another aspect of the present invention, the optical communication system comprises an optical tunable filter which transmits and extracts only a signal with a specific wavelength of a signal multiplexed by a wavelength division multiplexing (WDM) method and whose wavelength transmission characteristic varies depending on a control signal, a detection unit detecting signal light extracted by the optical tunable filter, an operation unit operating to generate information for designating a control signal needed to enable the optical tunable filter to extract signal light with a designated wavelength, based on the detected result of two segments of signal light located at each edge of a wavelength band obtained when the detection unit shifts the wavelength transmission characteristic of the optical tunable filter from outside the wavelength band including all segments of the multiplexed signal light, and a control signal generating unit generating the control signal based on the designation information.

In the signal light multiplexed by a WDM method, every two adjacent wavelengths are generally arrayed at a specific interval of a wavelength. Therefore, according to the above-mentioned configuration, a control signal to be applied to an optical tunable filter to extract each multiplexed signal light can be computed by interpolation operation based on a control signal to be applied to the optical tunable filter to extract each of a plurality of segments of multiplexed signal light located at each edge of the wavelength range including all segments of the multiplexed signal light, thus preventing the wrong extraction of a signal with a wavelength different from the desired wavelength.

In the above-mentioned optical communication system, the control signal generating unit can also perform the computation, based on the detected result and information indicating the current operating situation of the multiplexed signal light.

Since the current situation of the multiplexed signal light is known thus, a control signal to be applied to the optical tunable filter to extract each multiplexed signal light can be obtained for each signal light even if there is a lost channel due to the non-operation of the plurality of segments located at each edge of the wavelength band of the multiplexed signal light.

In another aspect of the present invention, the optical communication system comprises an optical tunable filter which transmits and extracts only a signal with a specific wavelength of a signal multiplexed by a wavelength division multiplexing (WDM) method and whose wavelength transmission characteristic varies depending on a control signal, a detection unit detecting signal light extracted by the optical tunable filter, an optical wavelength detecting unit detecting signal light with a specific wavelength of the signal extracted by the optical tunable filter, an operation unit operating to generate information for designating a control signal needed to enable the optical tunable filter to extract signal light with a designated wavelength, based on both the detected results by the detection unit and the optical wavelength detecting unit, and information indicating the current operating situation of the multiplexed signal light, and a control signal generating unit generating the control signal based on the designation information.

In the signal light multiplexed by a WDM method, every two adjacent wavelengths are generally arrayed at a specific interval of a wavelength. Therefore, according to the above-mentioned configuration, a control signal to be applied to an optical tunable filter to extract each multiplexed signal light can be computed by interpolation operation based on a control signal to be applied to the optical tunable filter to extract the signal light detected by the optical wavelength detecting unit, thus preventing the wrong extraction of a signal with a wavelength different from the desired wavelength.

In another aspect of the present invention, the optical communication system comprises an optical tunable filter which transmits and extracts only a signal with a specific wavelength of a signal multiplexed by a wavelength division multiplexing (WDM) method and whose wavelength transmission characteristic varies depending on a control signal, a detection unit detecting signal light extracted by the optical tunable filter, an reference signal light detecting unit detecting reference signal light that is known to be always included in the signal inputted to the optical tunable filter, of the signal light extracted by the optical tunable filter, an operation unit generating information for designating a control signal needed to enable the optical tunable filter to extract signal light with a predetermined wavelength, based on both the respective detected results by the detection unit and the reference optical light detection unit, and a control signal generating unit generating the control signal based on the designation information.

In the signal light multiplexed by a WDM method, every two adjacent wavelengths are generally arrayed at a specific interval of a wavelength. Therefore, according to the above-mentioned configuration, a control signal to be applied to an optical tunable filter to extract each multiplexed signal light can be computed by interpolation operation based on a control signal to be applied to the optical tunable filter to extract the wavelength of the reference signal light, thus preventing the wrong extraction of a signal with a wavelength different from the desired one.

In the above-mentioned optical communication system according to the present invention, the optical wavelength detecting unit can also detect signal light with a specific wavelength of the multiplexed signal light.

According to this configuration, a control signal to be applied to the optical tunable filter to extract each multiplexed signal light can be computed based on a control signal needed to extract this reference signal light by using signal light in an operating channel extracted from the multiplexed signal light as reference signal light.

In the above-mentioned optical communication system according to the present invention, the optical wavelength detecting unit can also comprise a periodic filter whose free spectrum range (FSR) is the same as the wavelength interval between two segments of adjacent signal light of the multiplexed signal light and whose wavelength transmission characteristic peak coincides with the wavelength of the signal light.

According to this configuration, even in an operation form where an operating channel in the multiplexed signal light is frequently changed, the optical wavelength detecting unit can detect signal light in one of the operation channels without performing special characteristic control over the optical wavelength detecting unit.

In this case, the full width at half maximum (FWHM) and its finesse of the periodic filter can also be between 0.1 nm and 0.3 nm and between 3 and 8, respectively.

Since by using a periodic filter having such a characteristic, signal light whose wavelength fluctuates within a specific allowance can be transmitted, the function required as the optical wavelength detecting unit can be displayed.

The above-mentioned optical communication system according to the present invention can also further comprise a control unit controlling a change of the wavelength transmission characteristic of the optical tunable filter so that the amount of light that the periodic filter transmits increases.

According to this configuration, since the tracking control can be applied to the optical tunable filter based on the detected result of the optical wavelength detecting unit, the optical tunable filter can extract stable signal light.

In another aspect of the present invention, the optical communication system comprises an optical tunable filter which transmits and extracts only a signal with a specific wavelength of a signal multiplexed by a wavelength division multiplexing (WDM) method and whose wavelength transmission characteristic varies depending on a control signal, a reference signal light detecting unit detecting reference signal light with a specific wavelength, of the signal light extracted by the optical tunable filter, an operation unit operating to generate information for designating a control signal needed to enable the optical tunable filter to extract signal light with a designated wavelength, based on both the detected result of the reference signal light detecting unit and information indicating the current operating situation of the multiplexed signal light, and a control signal generating unit generating the control signal according to the designation information.

In the signal light multiplexed by a WDM method, every two adjacent wavelengths are generally arrayed at a specific interval of a wavelength. Therefore, according to the above-mentioned configuration, a control signal to be applied to an optical tunable filter to extract each multiplexed signal light can be computed by interpolation operation based on a control signal to be applied to the optical tunable filter to extract the signal light detected by the optical wavelength detecting unit, thus preventing the wrong extraction of a signal with a wavelength different from the desired one. The tracking control can be applied to the optical tunable filter based on the detected result of the optical wavelength detecting unit.

In the earlier-mentioned optical communication system according to the present invention, the optical wavelength detecting unit can also comprise a periodic filter and the operation unit can also operate to generate information for designating a control signal needed to enable the optical tunable filter to extract the designated signal light, based on the detected result of two segments of signal light at each edge of the wavelength band that is transmitted through the periodic filter and is obtained when sifting the wavelength transmission characteristic of the optical tunable filter from the outside the wavelength range including all segments of the multiplexed signal light.

In this case, even if the earlier-mentioned FSR of the periodic filter provided as the optical wavelength detecting unit is not the same as the wavelength interval between two segments of adjacent light of the signal light, it can be known to which channel in operation the signal light detected by the optical wavelength detecting unit belongs, based on the information indicating the current operating situation of the multiplexed signal light. Therefore, a control signal to be applied to the optical tunable filter needed to extract each multiplexed signal light can be computed by interpolation operation based on a control signal to be applied to the optical tunable filter to extract the signal light detected by the optical tunable filter.

In the earlier-mentioned optical communication system according to the present invention, when receiving no instruction to extract signal light, the operation unit can also compute and generate in advance the designation information needed to select and extract one signal with an arbitrary wavelength from the earlier-mentioned multiplexed signal light, and upon receipt of the instruction later, it can also operate to generate the designation information needed to extract a designated signal light, based on information that it has obtained up to then.

Thus, the response time from the reception of an instruction to extract signal light to the generation of the designation information needed to extract designated signal light can be reduced.

In the earlier-mentioned optical communication system according to the present invention, if signal light to be extracted is modified, the operation unit can also operate to generate the designation information needed to extract modified designated signal light, based on information that it has obtained prior to the modification.

Thus, the response time from the reception of an instruction to modify signal light to be extracted to the generation of the designation information needed to extract the modified designated signal light can be reduced.

In the earlier-mentioned optical communication system according to the present invention, when the existence/non-existence of signal light is determined based on the detected result of the detection unit, reference signal light can also be determined based on a signal level detected by the detection unit when the wavelength transmission characteristic of the optical tunable filter is set in such a way as to transmit signal light with a wavelength located out of a wavelength band including all segments of the multiplexed signal light.

Thus, the wrong determination of a signal with a background noise level, which can never be said signal light in the wavelength spectrum of signal light inputted to the optical tunable filter, as signal light, due to influences, such as side lobes (lumps), etc., that exist in the wavelength transmission characteristic of the optical tunable filter, can be prevented.

In this case, when determining whether there is signal light, based on the detected result of the detection unit, the operation unit can also determine that a target signal is not signal light if the size of a target signal level is less than a predetermined value.

Thus, the wrong determination of a noise signal with a level less than the predetermined one in the wavelength spectrum of signal light inputted to the optical tunable filter, as signal light, due to influences, such as side lobes (lumps), etc., that exist in the wavelength transmission characteristic of the optical tunable filter, can be prevented.

In this case, the operation unit can also hold the maximum signal level of signal light detected by the detection unit when the wavelength transmission characteristic of the optical tunable filter is shifted in a range where the size of the target signal level is equal to and more than the predetermined value, and if detection unit detects a decrease from the maximum value, that is equal to or more than a predetermined value when continuing the shifting within the predetermined range after the maximum value is detected, it can also compute regarding the control signal generated by the control signal generating unit as an optimal control signal to be supplied to the optical tunable filter to extract the signal light when the maximum value is detected.

Thus, an optimal control signal can be generated without being affected by side lobes (lumps), etc., that exist in the wavelength transmission characteristic of the optical tunable filter.

The present invention also includes the control methods of the optical tunable filter adopted in each aspect of the above-mentioned optical communication system, which have the same functions and effects as each aspect of the optical communication systems.

BRIEF DESCRIPTION OF THE DRAWINGS

The present invention will be more apparent from the following detailed description when the accompanying drawings are referenced, in which:

FIG. 1 shows a network configuration of an OADM;

FIG. 5 shows the first configuration of an optical tunable filter control circuit of the present invention;

FIG. 7 shows the spectrum characteristic of an input signal;

FIG. 8 is a flowchart showing the contents of an RF signal frequency interpolation commutating process;

FIG. 11A shows the simulated result of the wavelength transmission characteristic of a periodic filter (No. 1);

FIG. 11B shows the simulated result of the wavelength transmission characteristic of a periodic filter (No. 2);

FIG. 12A shows the simulated result of the wavelength transmission characteristic of a periodic filter (No. 3);

FIG. 12B shows the simulated result of the wavelength transmission characteristic of a periodic filter (No. 4);

FIG. 13 shows the third configuration of an optical tunable filter control circuit of the present invention;

FIG. 14 shows the wavelength transmission characteristic of an AOTF;

FIG. 15 is a graph showing the relationship between an RF frequency and an AOTF trans at the transmitting light when a wavelength-division multiplexed signal is inputted;

FIG. 16 shows a control method for preventing the wrong signal detection due to a transmission characteristic;

DESCRIPTION OF THE PREFERRED EMBODIMENTS

The preferred embodiments of the present invention are described below.

Figure 2:
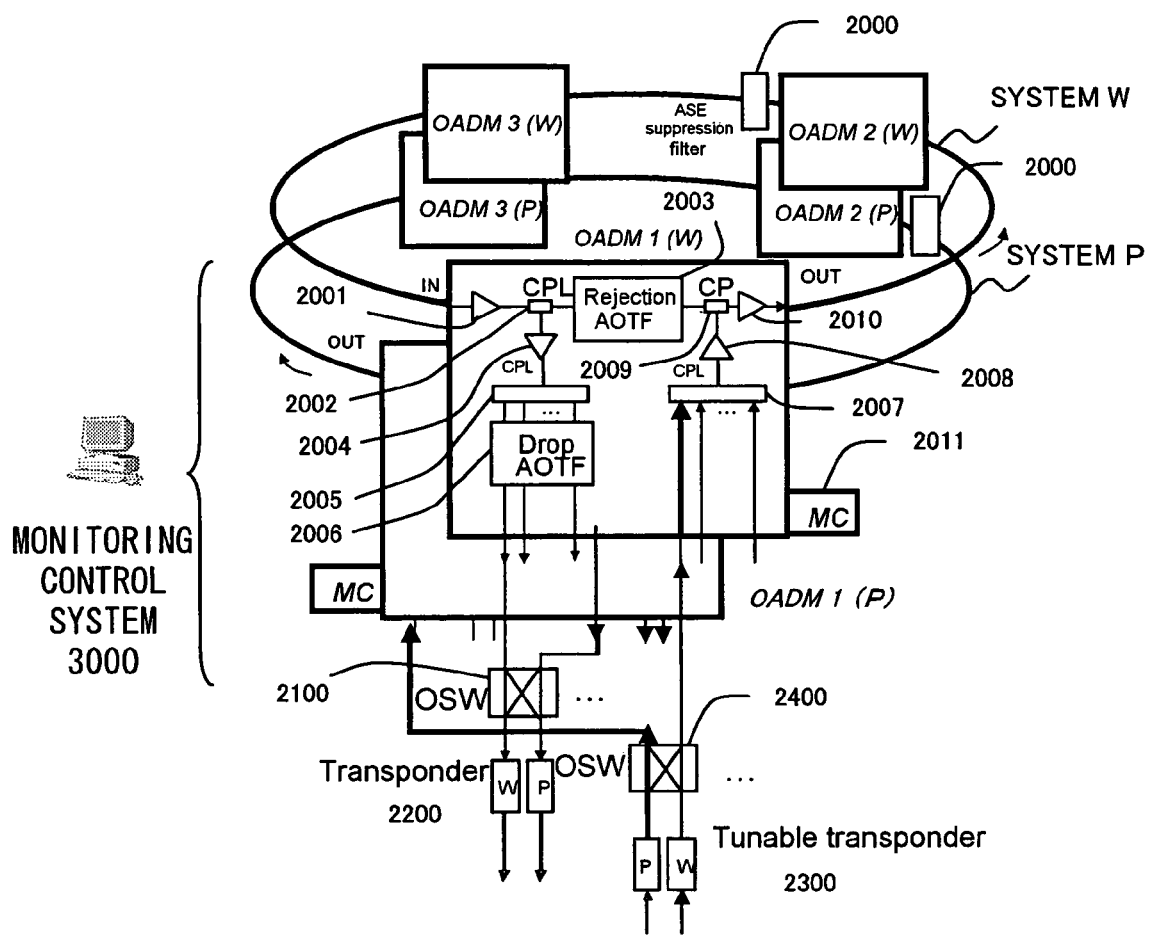
FIG. 2 shows a configuration of an OADM using an AOTF.
Figure 3A:
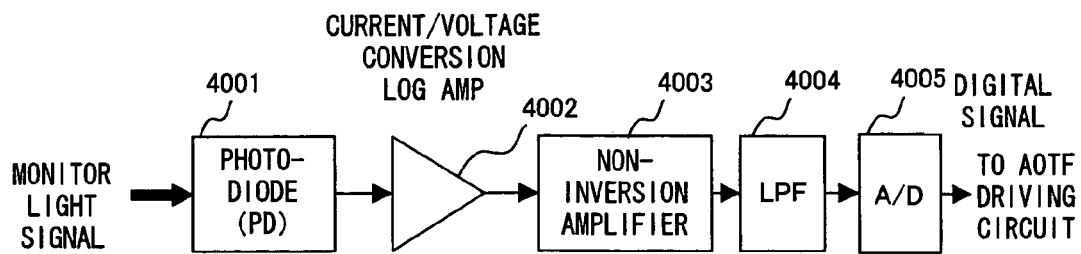
FIG. 3A shows the configuration of an optical detection circuit using a logarithmic amplifier.
Figure 3B:
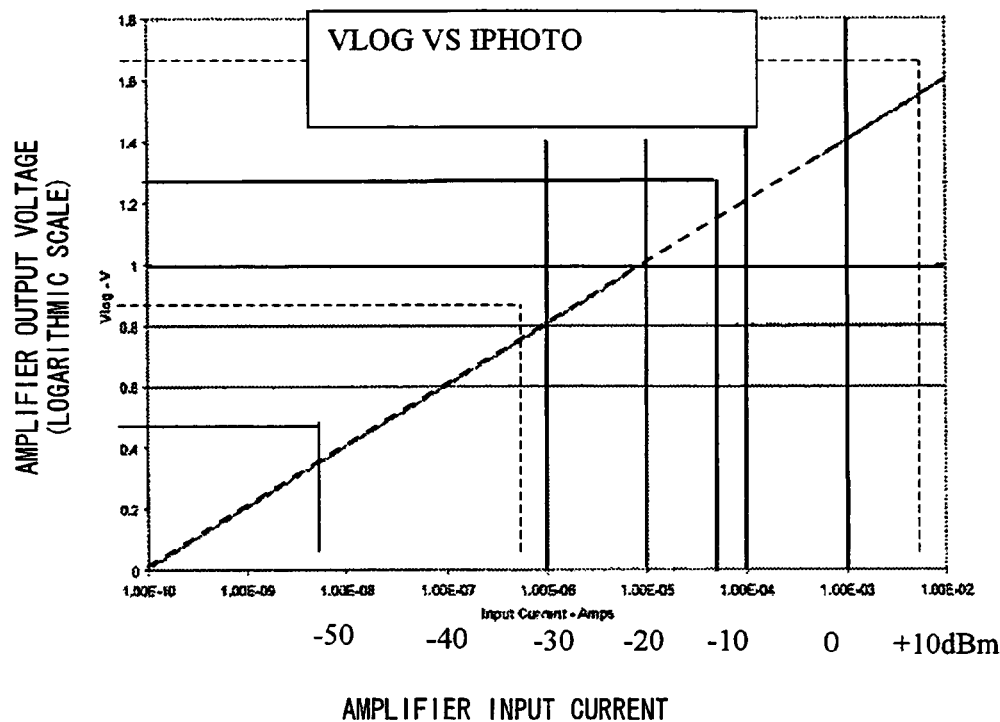
FIG. 3B shows the input current-output voltage characteristic of the logarithmic amplifier.
Figure 4:
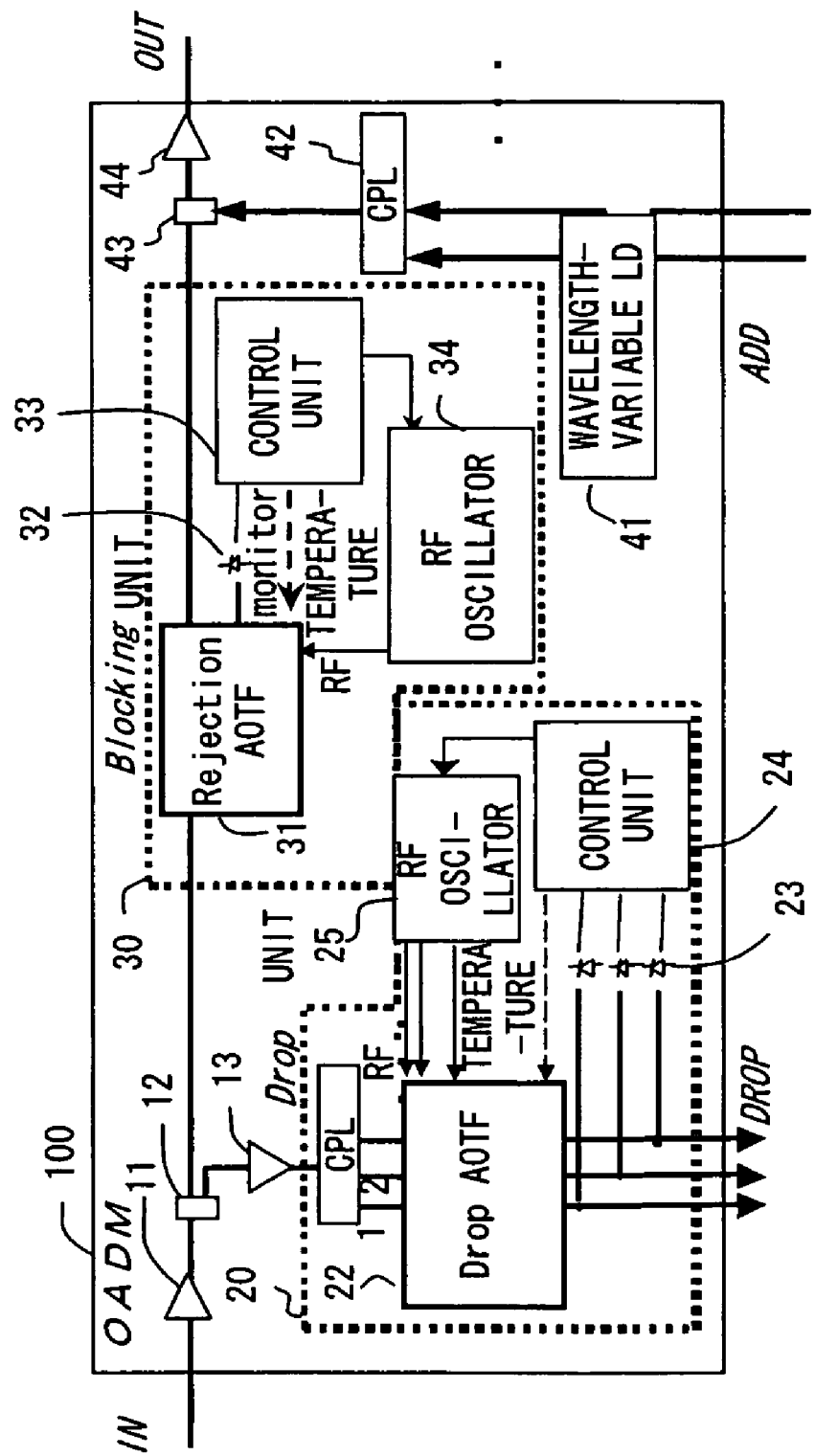
FIG. 4 shows the configuration an OADM using an ABTF of the present invention.

Firstly, FIG. 4 is described. FIG. 4 shows the configuration of OADM using the AOTF of the present invention.

In FIG. 4, a WDM signal inputted to an OADM 100 is amplified by an amplifier 11 and then is inputted to a CPL 12. The WDM signal that is transmitted through the CLP 12 is inputted to a blocking unit 30. However, part of signal light demultiplexed by the CPL 12 is amplified by an amplifier 13 and is inputted to a drop unit 20.

The drop unit 20 has a function to extract one signal with a desired wavelength for each channel, of the inputted WDM signal.

The WDM signal inputted to the drop unit 20 is demultiplexed into a plurality of signals and each of them is inputted to a drop AOTF 22. The drop AOTF 22 selects and extracts one segment of signal light with a desired wavelength of the WDM signal. Therefore, if there are a plurality of segments of signal light to drop, the same number as the plurality of segments of signal light, of drop AOTFs 22 are provided. The same number of photo-diodes 23, control units 24 and PF oscillators 25 are also provided. The extracted signal light becomes the drop output of the OADM 100.

Part of the signal light extracted by the drop AOTF 22 is demultiplexed by the CPL (not shown in FIG. 4) and is led to a photo-diode, being an optical detector, as monitor light. The photo-diode 23 converts this monitor light into an electric signal, and a signal with an electric current corresponding to the optical power of the monitor light is inputted to a control unit 24.

The control unit 24 controls the temperature of the drop AOTF 22 to be constant, and also controls the frequency of an RF signal generated by an RF oscillator 25, based on the signal obtained from the photo-diode 23.

The RF oscillator 25 oscillates an RF signal with a frequency, based on information from the control unit 24 and supplies the drop AOTF 22 with it to set the transmission characteristic of the drop AOTF 22 so as to transmit the sufficient amount of the channel signal light with a desired wavelength.

On the other hand, the blocking unit 30 to which the WDM signal that has been transmitted through the CPL 12 is inputted has a function to suppress and output the channel signal light with a desired wavelength that is extracted from the WDM signal, which is usually extracted by the drop unit 20.

The WDM signal inputted to the blocking unit 30 is then inputted to a rejection AOTF 31, and suppresses the channel signal light with a desired wavelength extracted from the WDM signal and outputs it to a CPL 43. This one rejection AOTF 31 has a function to suppress a plurality of segments of signal light each with a different wavelength extracted from the WDM light.

The signal light suppressed by the rejection AOTF 31 is led to a photo-diode 32, being an optical detector, as monitor light. The photo-diode 32 converts this monitor light into an electric signal, and the electric signal with a current corresponding to the optical power of the monitor light is inputted to a control unit 33.

The control unit 33 controls the temperature of the rejection AOTF 31 to be constant, and also controls the frequency of an RF signal generated by the RF oscillator 34, based on the signal obtained from the photo-diode 32.

The RF oscillator 34 generates an RF signal with a frequency based on information from the control unit 33 and supplies the rejection AOTF 31 with it to set the suppression characteristic of the rejection AOTF 31 so that the channel signal light with a desired wavelength can be sufficiently suppressed.

In the meantime, a signal to be transmitted to a network (ADD signal) is inputted to the wavelength-variable LD (laser diode) 41 of the OADM 100. Then, the signal is converted into signal light with a predetermined wavelength. The signal light is multiplexed with a plurality of segments of other signal light each with a different wavelength by a CPL 42. The signal light multiplexed by the CPL 42 is inputted to a CPL 43 and is multiplexed with the signal light transmitted without being suppressed by the blocking unit 30, of the WDM signal inputted to the OADM 100. The WDM signal multiplexed by the CPL 43 is amplified up to a predetermined size by an amplifier 44 and then is transmitted from the OADM 100.

The OADM 100 shown in FIG. 4 is configured as described above.

Next, a method for controlling the tunable filter of the present invention is described. The control method of the drop AOTF 22 selecting one signal with a desired wavelength under the control of the control unit 24 provided for the drop unit 20 of the OADM 100 shown in FIG. 4, is described.

Firstly, FIG. 5 is described. FIG. 5 shows the first configuration of the optical tunable filter control circuit of the present invention. This optical tunable control circuit is provided for the drop unit 20 of the OAADM 100 shown in FIG. 4.

In FIG. 5, an optical tunable filter 51 selects and extracts one signal with a desired wavelength for each channel from a WDM signal inputted to it, which corresponds to the drop AOTF 22 of the OADM 100 shown in FIG. 4.

A CPL 52 demultiplexes signal light extracted by the optical tunable filter 51 and outputs part of the signal light as monitor light.

A light detection unit 53 detects the optical power of the monitor light outputted from the CPL 52 and outputs information corresponding to the strength of the signal light extracted by the optical tunable filter 51, which corresponds to the photo-diode 23 of the OADM 100 shown in FIG. 4.

An operation circuit 54 comprises a CPU (central processing unit) and memory storing a control program needed to enable the CPU to perform a variety of control processes. The circuit 54 performs a prescribed operation, based on the above-mentioned information obtained from the light detection unit 53 and operating signal wavelength information obtained by a monitoring control system, which is not shown in FIG. 5, for monitoring and controlling the operating situation of a network in which an optical communication system is provided with this optical tunable filter, and outputs the computed result to a driving circuit 55. This operating signal wavelength information indicates an operating channel of the channels of a WDM signal (being actually transmitted through the network) included in an input signal. The control unit 24 of the OADM 100 shown in FIG. 4 corresponds to this operation circuit 54.

The driving circuit 55 drives the optical tunable filter 51 by generating a control signal, based on information obtained from the operation circuit 54 and supplying the optical tunable filter 51 with it, which corresponds to the RF oscillator 25 of the OADM 100 shown in FIG. 4.

Next, the control method of the optical tunable filter 51, that is performed by the operation circuit 54 and driving circuit 55 of the optical tunable filter control circuit shown in FIG. 5, is described.

Figure 6:
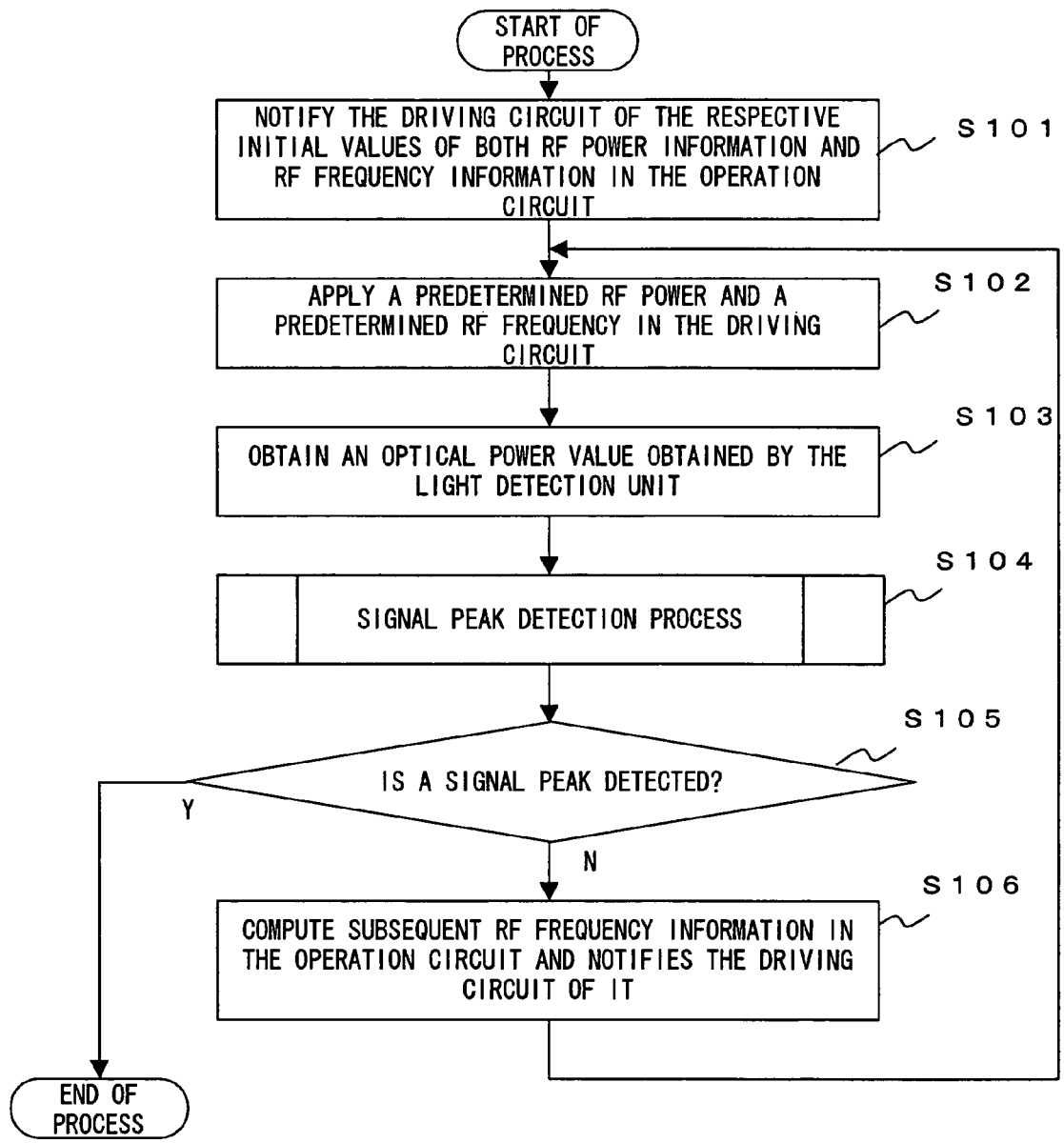
FIG. 6 is a flowchart showing the control procedure of the optical tunable filter.

Firstly, FIG. 6 is described. FIG. 6 is a flowchart showing the control process of the optical tunable filter 51 for detecting the signal peak of monitor light.

The process shown in FIG. 6 is started by the reception of an instruction to detect the signal peak of monitor light.

Firstly, in step S101, the operation circuit 54 notifies the driving circuit 55 of the respective initial values of information indicating the power value of an RF signal and its frequency to be applied to the optical tunable filter 51.

In step S102, the driving circuit 55 applies an RF signal with a power value and a frequency to the optical tunable filter 51, based on information notified by the operation circuit 54.

In step S103, the operation circuit 54 obtains information indicating the power value of monitor light, detected by the light detection unit 53.

In step S104, the operation circuit 54 executes a signal peak detection process. This process determines whether the power value of monitor light indicated by the information obtained in step S103 is less than the maximum power value of monitor light, previously obtained, by a predetermined threshold value. If the determination in step S104 is yes, the maximum power value of monitor light, obtained up to then, is detected as the signal peak.

In step S105, the operation circuit 54 determines whether the peak of channel signal light with a desired wavelength is detected in step S104. If the determination in step S105 is yes, the control of the optical tunable filter 51 terminates. If the determination in step S105 is no, in step S106, the operation circuit 54 computes the frequency of an RF signal to be applied to change the current wavelength transmission characteristic of the optical tunable filter 51 and notifies the driving circuit 55 of the computed result. After that, the above-mentioned processes in and after step S102 are repeated, and when the signal peak of monitor light is detected, the control shown in FIG. 6 terminates.

That's all for the control of the optical tunable filter 51 for detecting the signal peak of monitor light.

In the following description, unless otherwise specially mentioned, a signal inputted to the optical tunable filter 51 is a WDM signal in which at maximum n channels can be multiplexed at equal intervals of a wavelength, as shown by the spectrum characteristic of an input signal in FIG. 7, and reference signal light for network monitoring can also be involved in it. The wavelength of this reference signal light is either sufficiently shorter than that of channel 1, which is the shortest of those of a plurality of segments of signal light that can be multiplexed as the WDM signal or sufficiently longer than that of channel n, which is the longest of those of the plurality of segments that can be multiplexed as the WDM signal.

Next, a method for controlling the optical tunable filter 51 so that signal light with a desired wavelength can be properly extracted of a WDM signal, based on the earlier-mentioned operating signal wavelength information and the optical power value of monitor light, detected by the light detection unit 53, by the control shown in FIG. 6, is described.

Firstly, the first method for controlling so as to extract signal light with a desired wavelength from a WDM signal is described. This method does not need the earlier mentioned reference signal light for an input signal.

This method is obtained by slightly modifying the control method of the optical tunable filter 51 for detecting the signal peak of monitor light shown in FIG. 6.

Firstly, in step S106 of FIG. 6, the initial value of information indicating the frequency of an RF signal to be applied to the optical tunable filter 51 is set so as to show a transmission characteristic that signal light with a wavelength sufficiently shorter than channel 1 which is the shortest one of all segments of signal light to be multiplexed of a WDM signal. Taking into consideration the change in temperature of the optical tunable filter 51, this initial value is set to a frequency in which the signal light of channel 1 cannot be transmitted through the optical tunable 3 filter 51 even by the anticipated change in temperature.

Then, in step S102, the application of the RF signal to the optical tunable filter 51 is started, and in step S103, the power value of monitor light is obtained by the operation circuit 54.

In steps S104 and 105, the operation circuit 54 detects the signal peak of signal light included in an input signal. In this case, the signal peaks of all channels included in the input signal is detected. Therefore, in step S106, the operation circuit 54 computes the frequency of an RF signal to be applied to shift the current wavelength transmission characteristic of the optical tunable filter 51 in a long-wavelength direction. Thus, the signal peaks are detected in ascending order of a wavelength.

By the above-mentioned processes, the signal peaks of all channels included in an input signal are detected. Therefore, the optimal frequency of an RF signal to be applied to the optical tunable filter 51 to transmit signal light that is operating on a network can be determined for each channel by uniquely relating each of the detected results to one of a plurality of segments of operating signal wavelength information in ascending order of a wavelength. Thus, if the operation circuit 54 notifies the driving circuit 55 of predetermined information and the RF signal with an optimal frequency for channel signal light with a desired wavelength to transmit is applied to the optical tunable filter 51, the channel signal light with a desired wavelength can be extracted from the input signal. After that, the known tracking control can be started.

Although in the above-mentioned control method, as shown by an arrow mark (A) in FIG. 7, a signal peak is detected by shifting the wavelength transmission characteristic from a shorter wavelength toward a longer one, as shown by an arrow mark (B) in FIG. 7, the wavelength transmission characteristic can also be conversely shifted from a longer wavelength toward a shorter one.

Although in the above-mentioned control method, each detected result is uniquely related to one of the plurality of segments of operating wavelength information, but if it is known in advance that all channels are always operated in a WDM signal which is an input signal, the n detected peaks can also be simply related to channels 1, 2, ..., n in ascending order of a wavelength. In this case, no above-mentioned operating wavelength information is needed.

Next, the second control method for extracting signal light with a desired wavelength from a WDM signal, is described. This method controls and computes the optimal frequency of an RF signal to be applied to the optical tunable filter to extract signal light with a desired frequency from an input signal by interpolation.

This method does not also need the earlier-mentioned reference signal light for an input signal. This method also follows the procedure shown in FIG. 6. Firstly, in step S101, the initial value of information indicating the frequency of an RF signal to be applied to the optical tunable filter 51 is set so as to show a transmission characteristic that signal light with a wavelength sufficiently shorter than channel 1 which is the shortest one of all segments of signal light to be multiplexed of a WDM signal. Then, in steps S102 through 106, as shown in an arrow mark (C) in FIG. 7, the optimal frequency of an RF signal to be applied to the optical tunable filter 51 to transmit channel signal light with the shortest wavelength of a WDM signal included in an input signal can be obtained by shifting the wavelength transmission characteristic of the optical tunable filter 51 in the longer direction of a wavelength.

Then, the procedure shown in FIG. 6 is again followed. This time, in step S101, the initial value of information indicating the frequency of an RF signal to be applied to the optical tunable filter 51 is set so as to show a transmission characteristic that signal light with a wavelength sufficiently longer than channel n which is the longest one of signal light to be multiplexed of a WDM signal is transmitted. Then, in steps 102 through 106, as shown by an arrow mark (D), the optimal frequency of an RF signal to be applied to the optical tunable filter 51 to transmit channel signal light with the longest wavelength of a WDM signal included in an input signal can be obtained by shifting the wavelength transmission characteristic of the optical tunable filter 51 in the shorter direction of a wavelength.

After obtaining the two optimal frequencies of the RF signal, the operation circuit 54 performs the process shown by the flowchart in FIG. 8, and computes the optimal frequency of the RF signal to be applied to the optical tunable filter 51 to transmit signal light with a desired wavelength included in the input signal. The process shown in FIG. 8 is described below.

Firstly, in step S201, the respective channel numbers of signal light with the shortest wavelength (called "peak 1") and signal light with the longest wavelength (called "peak 2"), whose peaks are detected in the process shown in FIG. 6, are obtained by referring to operating signal wavelength information.

Then, in step S202, the amount of change $\Delta f$ in the frequency of an RF signal that is applied to the optical tunable filter 51 and is changed so as to transmit adjacent channel signal light is computed according to the following equation:

$$\Delta f = (fa - fb)/(b - a)$$

where
a: Channel number of peak 1
b: Channel number of peak 2
fa: Optimal frequency of an RF signal to be applied to the optical tunable filter 51 for peak 1 to transmit
fb: Optimal frequency of an RF signal to be applied to the optical tunable filter 51 for peak 2 to transmit Then, in step S103, the optimal frequency fk of an RF signal to be applied to the optical tunable filter 51 to transmit signal light with a desired wavelength of channel k by executing one of the following equations:

$$fk = fa - \{\Delta f \times (k - a)\}$$

or $$fk = fb - \{\Delta f \times (b - k)\}$$

The above-mentioned equations are described below with reference to FIG. 9.

Figure 9:
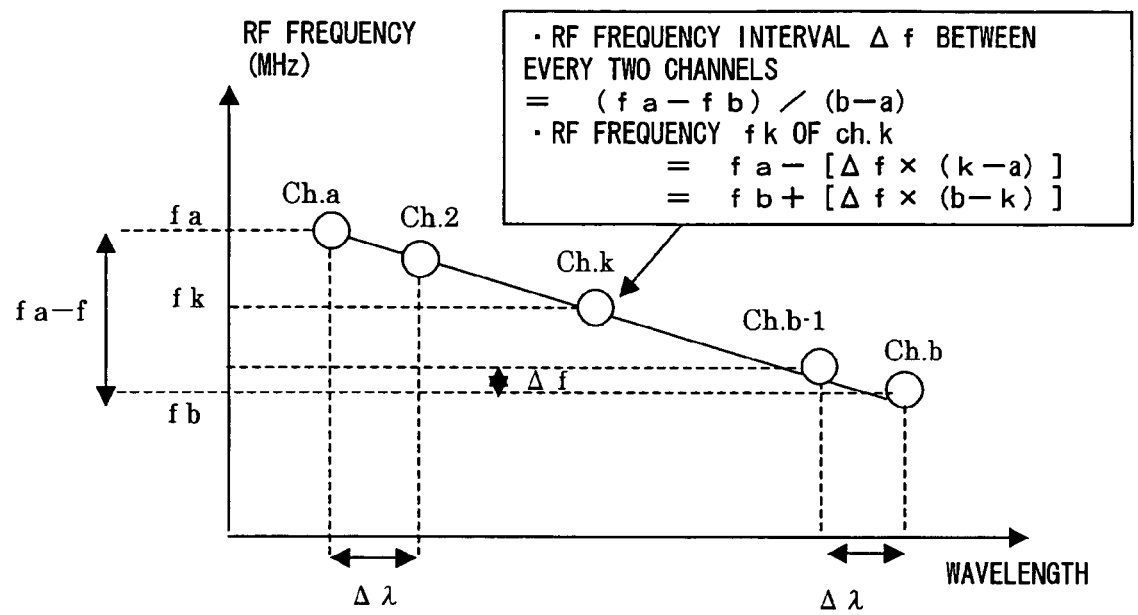
FIG. 9 shows a method for computing an RF signal frequency by interpolation.

As shown in FIG. 9, the wavelength interval $\Delta \lambda$ between two segments of signal light of adjacent channels included in an input signal is constant. Then, assuming that a relationship between the rate of change in the frequency of an RF signal to be applied to the optical tunable filter 51 and the rate in change in the wavelength transmission characteristic of the optical tunable filter 51 is constant, in the above-mentioned equations, fk can be computed using the value of k by linear interpolation based on values, a, b, fa and fb.

If the operation circuit 54 notifies the driving circuit 55 of fk obtained in the process shown in FIG. 8 and an RF signal with frequency fk is applied to the optical tunable filter 51, a channel signal light with a desired wavelength can be extracted from an input signal. Then, the known tracking control can be started.

Although in the earlier-mentioned first method, peak detection which takes some time is applied to all segments of signal light included in an input signal, in the second method, it is applied only to signal light with the shortest wavelength and to one with the longest wavelength of all segments of signal light included in the input signal. Therefore, in the second method, time needed to complete the control can be reduced.

Although in the above-mentioned control method, peaks 1 and 2 are related to operating signal wavelength information, peaks 1 and 2 can also be related to channels 1 and n, respectively, if it is known in advance that channel 1, being a signal with the shortest wavelength, and channel n, being one with the longest wavelength, which can be multiplexed in a WDM signal, being an input signal, both are always operated. In this case, no earlier-mentioned operating signal wavelength information is needed.

Next, the third control method for extracting signal light with a desired wavelength from a WDM signal is described. This method controls by obtaining the optical frequency of an RF signal to be applied to an optical tunable filter to transmit signal light with a known wavelength and computing the optical frequency of the RF signal to be applied to the optical tunable filter to transmit signal light with a desired wavelength using the frequency.

In this method, operating signal wavelength information obtained from a monitoring control system includes information indicating an actually operating channel of all the channels of a WDM signal included in an input signal and information indicating the wavelength of the signal light of the operating channel.

Figure 10:
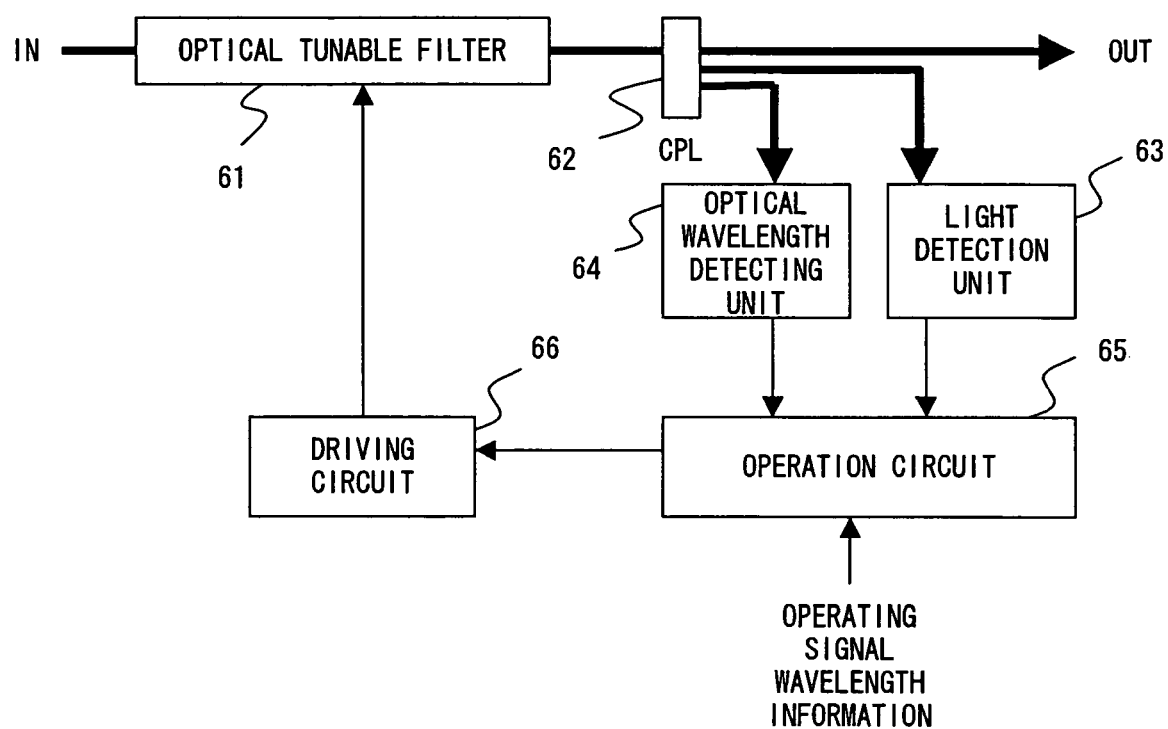
FIG. 10 shows the second configuration of an optical tunable filter control circuit of the present invention.

In this method, some modifications are made to the configuration of the optical tunable filter control circuit shown in FIG. 5. FIG. 10 shows the configuration of the optical tunable filter control circuit actually adopted in this method.

The configuration shown in FIG. 10 comprises an optical tunable filter 61, a CPL 62, a light detection unit 63, an operation circuit 65 and a driving circuit 66 as in that shown in FIG. 5, which comprises the optical tunable filter 51, the CPL 52, the light detection unit 53, the operation circuit 54 and the driving circuit 55. However, the configuration shown in FIG. 10 differs from that shown in FIG. 5 in that a monitor light is branched into two systems in the CPL 62 and in the type of information to be inputted to the operation unit 65.

An optical wavelength detecting unit 64 detects the earlier-mentioned reference signal light from input signal and outputs information indicating its optical power value to the operation circuit 65. This optical wavelength detecting unit 64 can take any configuration, for example, it can comprise a wavelength locker using an etalon or a FBG (fiber bragg grating), a spectrum monitor, and the like. Then, the unit 64 is set in advance to detect signal light with a known wavelength.

In the circuit shown in FIG. 10, firstly, the optimal frequency of RF signal to be applied to the optical tunable filter 61 needed to transmit one signal with a desired wavelength is selected from each of the reference signal light and a WDM signal in advance by the earlier-mentioned first or second method, and for example, its frequency information is stored in memory provided for the operation circuit 65.

Then, the process shown in FIG. 6 is performed by the operation circuit 65 and the driving circuit 66. However, in step S103, the operation circuit 65 obtains the optical power value of monitor light, based on the power value detected by the optical wavelength detecting unit 64, instead of one detected by the light detection unit 63. By performing the process shown in FIG. 6 thus, the optimal frequency of an RF signal to be applied to the optical tunable filter 61 to transmit the reference signal light can be specified.

Then, the operation circuit 65 computes both the amount of change in this specified frequency and that in the earlier-mentioned frequency stored in memory. Then, the operation circuit 65 performs a process of adding or subtracting the above-mentioned amounts of change to or from the optimal frequency of an RF signal to be applied to the optical tunable filter 61 to transmit. signal light with a desired wavelength stored in the memory. So, an optimal frequency of an RF signal to be applied to the optical tunable filter 61 to transmit signal light with a desired wavelength at the current ambient temperature can be obtained. Then, if this frequency of the RF signal is applied to the optical tunable filter 61, the channel signal light with a desired wavelength can be extracted from an input signal. After that, the known tracking control can be started.

In this third method, peak detection, which takes sometime, is applied only to one segment of signal light. Therefore, time needed to complete the control can be reduced compared with the second method.

Although in the above-mentioned control method, the optimal frequency of an RF signal is obtained using the reference signal light, the optimal frequency of the RF signal can also be obtained using the channel signal light, instead of the reference signal light, by specifying an actually operating channel in the WDM signal to be inputted based on the operating signal wavelength information. In this case, no reference signal light is needed.

In such a case, a periodic filter in which an FSR (free spectrum range) coincides with a wavelength interval between every two adjacent channels in a WDM signal and the peak of the wavelength transmission characteristic coincides with the peak of each channel signal light, can be provided as the optical wavelength detecting unit 64. By doing so, all segments of channel signal light, being a WDM signal, can be made the target of the reference signal light. In this case, for example, even if a reference channel must be changed because an operating channel is frequently changed, no resetting of the optical wavelength detecting unit 64 is needed. In this case, for example, the optimal frequency of an RF signal for channel signal light with the shortest or longest wavelength in a WDM signal can be obtained in the same way as the second method, and this channel signal light can be used as the reference frequency in the same way as the above-mentioned third method.

It is preferable for the full width at half maximum (FWHM) and finesse of the characteristic of a periodic filter provided as this optical wavelength detecting unit 64 to be between 0.1 and 0.3 nm and between 3 and 8, respectively, if the wavelength interval of a wavelength transmission characteristic is 100 GHz (that is, approximately 0.8 nm).

Since generally, the wavelength of signal light fluctuates in a range of approximately ±0.05 nm (±50 pm) due to the fluctuations of temperature at the time of control, the fluctuations of a drive current or the fluctuations of an ambient environment, the periodic filter provided as the optical wavelength detecting unit 64 is needed a characteristic of transmitting the signal light even if there are fluctuations in such a range of wavelength of each channel signal light of a WDM signal.

If the 50% decrease in power of signal light due to the deviation of a signal wavelength or the deviation of a transmission characteristic due to the manufacturing accuracy of a filter, is allowed, the full width at half maximum (FWHM) of 0.1 nm or more of the periodic filter is needed. This is because if the FWHM is less than 0.1 nm, the amount of change in a peak power increases due to a very little fluctuation of signal light. For example, in order to suppress the amount of change in the peak power in a range of ±0.05 nm by more than 10%, the width (spectral width) of a portion where the wavelength transmission characteristic of the periodic filter drops by more than 10% must be 0.1 nm or less. Such a characteristic of a filter can be converted into an FWHM of approximately 0.3 nm. Therefore, it is preferable for the characteristic of a periodic filter to be between 0.1 and 0.3 nm.

FIGS. 11A, 11B, 12A and 12B show the simulated result of the wavelength transmission characteristic of a periodic filter, obtained when changing an FWHM value if the wavelength interval of a wavelength transmission characteristic is 100 GHz (that is, approximately 0.8 nm), being the wavelength interval between two segments of adjacent channel signal light. It is known from these simulated results that in order to locate the FWHM of the characteristic of a periodic filter between 0.1 and 0.3 nm, finesse must be between approximately 2.6 (FIG. 11B) and 8 (FIG. 11A).

If the earlier-mentioned periodic filter is provided as the optical wavelength detecting unit 64, in the earlier-mentioned tracking control performed by both the operation circuit 65 and the driving circuit 66 to enable the wavelength transmission characteristic of the optical tunable filter 61 to follow the wavelength deviation of signal light with a desired wavelength, that is, the control of detecting monitor light that is obtained by demultiplexing signal light with a desired wavelength extracted by the light detection unit 63 and changing the frequency of an RF signal in such a way as to maximize the power of the monitor light, the monitor light can also be similarly detected by the optical wavelength detecting unit 64, instead of the light detection unit 63.

If the above-mentioned tracking control is performed using a periodic filter provided as the optical wavelength detecting unit 64 thus, the optical tunable filter 71 can also be controlled by the configuration obtained by deleting the light detection unit 63 from the configuration shown in FIG. 10, that is, the configuration of the third optical tunable filter control circuit of the present invention as shown in FIG. 13. The optical tunable filter 71, CPL72, operation circuit 74 and driving circuit 75 shown in FIG. 13 are the same as the optical tunable filter 51, CPL 52, operation circuit 54 and driving circuit 55, respectively, shown in FIG. 5. The optical wavelength detecting unit 73 shown in FIG. 13 is provided with the earlier-mentioned periodic filter with the earlier-mentioned wavelength transmission characteristic like the optical wavelength detecting unit 64 as shown in FIG. 10.

In FIG. 10, although a periodic filter in which an FSR does not coincide with the wavelength interval between every two adjacent channels in a WDM signal is provided as the optical wavelength detecting unit 64, if it coincides with an integral multiple of the wavelength interval, it can also control the optical tunable filter 61.

In this case, a channel for signal light that can be transmitted through a periodic filter provided as the optical wavelength detecting unit 64, of a WDM signal included in an input signal is checked in advance, and further more a currently operating channel of all channels is specified based on operating signal wavelength information. Then, the same process as the above-mentioned second control method is performed.

Specifically, firstly, the frequency of an RF signal to be applied to the optical tunable filter is changed and the wavelength transmission characteristic of the filter is shifted from a sufficiently short wavelength against a WDM signal toward a longer wavelength, and the frequency of the RF signal obtained when the signal peak of monitor light is detected in the first place after it is transmitted through the periodic filter, is obtained by the operation circuit 65. The frequency obtained then is a currently operating one of all segments of signal light that can be transmitted through the periodic filter and is the optimal frequency of the RF signal in which signal light with the shortest wavelength can be transmitted.

Then, if the frequency of an RF signal to be applied to the optical tunable filter is changed and the wavelength transmission characteristic of the filter is shifted from a sufficiently long wavelength against a WDM. signal toward a shorter wavelength, the frequency of the RF signal obtained when the signal peak of monitor light is detected in the first place after it is transmitted trough the periodic filter, is obtained by the operation circuit 65. The frequency obtained then is a currently operating one of all segments of signal light that can be transmitted through the periodic filter and is the optimal frequency of the RF signal in which signal light with the longest wavelength can be transmitted.

Since the optimal frequencies of the RF signal to be applied to the optical tunable filter 61 to transmit the two segments of channel signal light, of the WDM signal are obtained thus, the operation circuit 65 can compute the optimal frequency of the RF signal needed to transmit each channel of the WDM signal by conducting linear interpolation in the same way as the earlier-mentioned second control method.

By performing the above-mentioned process, even if a periodic filter in which an FSR does not coincide with the wavelength interval between every two adjacent channels in a WDM signal is provided as the optical tunable filter 64, it can control the optical tunable filter 61.

Any of the above-mentioned various control methods is applied when a request to extract a channel signal light with a desired wavelength from a WDM signal is received. However, even when this request is not received, that is, the control circuit is in a waiting state, the selection of an arbitrary channel and tracking control can be always made possible. In this case, since the operation circuit 65 always catches the relationship between the frequency of an RF signal to be applied to the optical tunable filter 61 and a wavelength transmission characteristic, the execution of a process of detecting the peak of signal light included in an input signal can be done without after receiving the request. Therefore, the response time between the reception of such a request and the completion of such control can be reduced.

If the optical tunable filter 61 is extracting an arbitrary channel from a WDM signal included in an input signal and a request to extract a channel different from the channel is received, the operation circuit 65 can also compute the optimal frequency of an RF signal to be applied to extract the requested channel signal light using both the relationship between the channel number of signal light currently extracted by the optical tunable filter and the frequency of the applied RF signal and the relationship between the frequency of the RF signal to be applied to the optical tunable filter and the wavelength transmission characteristic, which are then known. In this case, too, since the execution of a process of detecting the peak of signal light included in an input signal can be done without after receiving the request. Therefore, the response time between the reception of such a request and the completion of such control can be reduced.

The application of the above-mentioned various control methods is not limited to a case where an AOTF is used as the optical tunable filter, and they can also be applied to cases where other optical tunable filters are used.

Next, the case where an AOTF is used as an optical tunable filter to be controlled in each of the above-mentioned control methods is described.

FIG. 14 shows the wavelength transmission characteristic of an AOTF. Although the AOTF provides a narrow-band wavelength transmission characteristic, side lobes (lumps) appear at the upper and lower ends of the main lobe of the wavelength transmission characteristic. Since these side lobes are sufficiently isolated from the main lobe, they pose no problem on the selection of signal light.

However, if the signal peak is detected by sweeping the frequency of an RF signal to be applied to the AOTF, as in the earlier-mentioned first and second methods, sometimes a problem occurs.

Here, FIG. 15 is described. FIG. 15 is a graph showing the relationship between the frequency of an RF signal applied to the AOTF and the optical power value of signal light that has been transmitted through the AOTF. FIG. 15 shows the optical power value of the signal light that has been transmitted through the AOTF, that is detected when sweeping the frequency of the RF signal to be applied to the AOTF. However, a very small peak appears in this graph (portion encircled with a broken line in FIG. 15) due to the influence of side lobes in the earlier-mentioned wavelength transmission characteristic of the AOTF.

The detection of such a peak leads to the wrong correspondence between each channel signal light of a WDM signal and an observed signal peak, and it sometimes leads to the wrong setting of the optimal frequency of an RF signal needed to extract a channel signal light with a desired wavelength. Particularly, if such a very small peak appears when an light detection unit using a logarithmic amplifier, which has been described in the Related Art, is used, a power change in the very small peak is observed as a large change. Therefore, there is a high possibility that such an error may occur.

An AOTF control method for solving the above-mentioned problem is described below with reference to FIG. 16.

In the following description, an AOTF controlling circuit has the configuration shown in FIG. 5. Then, the optical tunable filter 51 shown in FIG. 5 corresponds to the AOTF.

Firstly, an RF signal with a frequency by which the wavelength transmission characteristic of the AOTF is shifted so that a wavelength sufficiently away from the signal band of a WDM signal included in an input signal (for example, corresponding to more than ten times the wavelength interval between two adjacent channels) can be transmitted, is applied to the AOTF. In this case, the power value detected by the light detection unit 53 is called a "noise level". Then, signals with a power value between this noise level and a predetermined "regulated noise width" are not regarded as signal light.

Then, the value detected by the light detection unit 53 is controlled so as to exceed a signal level (="noise level"+ "regulated noise width") by sweeping (in FIG. 16, increasing) the frequency of the RF signal at specific intervals of a frequency. A signal with a power value exceeding this signal level is regarded as signal light, and the peak of this signal is detected.

Then, a value P (t) detected at time t by the light detection unit 53 is compared with that P (t−1) detected at time (t−1), and it is determined that the value is increasing or decreasing. If the value is increasing, it is determined that the value is increasing and the frequency sweep of the RF signal is continued. If the value is decreasing, the frequency of the RF signal detected at time (t−1) when value P(t−1) is detected, is temporarily determined to be a frequency to be applied to the AOTF needed to transmit the peak of the signal light.

Next, the amount of decrease of the detected value of this signal light from the frequency of the RF signal by which value P(t−1) is detected to the detected peak width which is a predetermined frequency range is observed, and it is determined whether the amount of decrease of this detected value is larger than the "determined peak width". If the amount of decrease is larger than the "determined peak width", detected value P(t−1) is a "signal peak point", and the frequency of the RF signal detected at time (t−1) when this signal peak point is detected is formally determined to be a frequency to be applied to transmit the peak of the signal light. If the amount of decrease is not larger than the determined peak width, it is determined that the frequency of the RF signal detected at time (t−1) is not a frequency to be applied to transmit the peak of the signal light, and the earlier-mentioned process is repeated to detect the new peak of the signal light.

By detecting the peak of signal light in the above-mention procedure, wrong signal detection due to the side lobes of an AOTF can be prevented.

Figure 17:
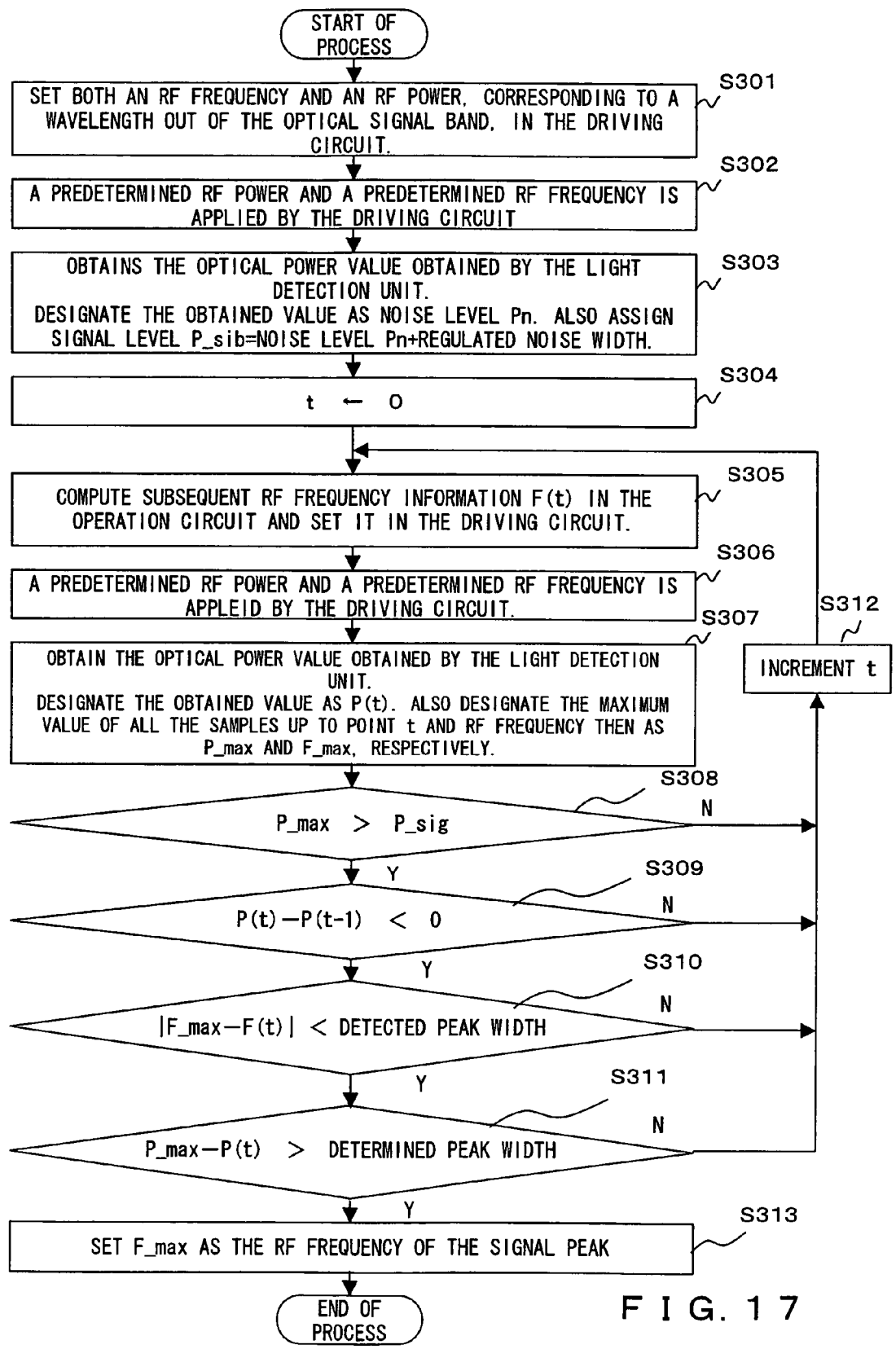
FIG. 17 is a flowchart showing the control procedure of the AOTF that prevents the wrong detection of a peak signal.

Here, FIG. 17 is described. FIG. 17 is a flowchart showing the AOTF control process of preventing the wrong detection of a peak signal. This process is performed by both the operation circuit 54 and driving circuit 55 shown in FIG. 5.

Firstly, in step S301, the operation circuit 54 notifies the driving circuit 55 of the respective initial values of both information indicating the power value of an RF signal to be applied to an AOTF (optical tunable filter 51) and information indicating its frequency. In this case, the frequency information notified to the driving circuit 55 indicates a frequency by which the wavelength transmission characteristic of the AOTF is shifted so that a wavelength sufficiently away from the signal band of a WDM signal included in an input signal can be transmitted.

In step S302, the driving circuit 55 applies an RF signal with a power value and a frequency that are based on the information notified by the operation circuit 54 to the AOTF In step S303, information indicating the power value of monitor light, which is detected by the light detection unit 53, is obtained and the power value indicated by this information is defined as a noise level Pn by the operation circuit 54. Furthermore, the sum of this noise level Pn and a predetermined regulated noise width is defined as a signal level P_sig by the operation circuit 54.

In step S304, the operation circuit 54 assigns an initial value "0" to a variable t.

In step S305, the operation circuit 54 notifies the driving circuit55 of a frequency value obtained by adding a predetermined frequency interval to the frequency value immediately before notified to the driving circuit 55, to sweep the frequency of the RF signal generated by the driving circuit 55. The frequency value notified at this time is F(t).

In step S306, the driving circuit 55 applies the RF signal with a power value and a frequency that are based on the information notified by the operation circuit 54.

In step S307, the operation circuit 54 obtains the information indicating the power value of the monitor light, that is detected by the light detection unit 53, and assigns the power value indicated by this information to P(t). Furthermore, the operation circuit 54 defines the maximum power value obtained up to then as P_max, and also defines the frequency of the RF signal generated by the driving circuit 55 when this P_max is detected, as F_max.

In step S308, the operation circuit 54 determines whether P_max is larger than P_sig, that is, P_max exceeds the signal level. If this determination is yes, the process proceeds to step S309. If this determination is no, the process proceeds to step S312.

In step S309, the operition circuit 54 determines whether a value obtained by subtracting P(t−1) from P(t) is negative, that is, the power value of the monitor light is decreasing. If this determination is yes, the process proceeds to step S310. If this determination is no, the process proceeds to step S312.

In step S310, the operation circuit 54 determines whether the difference between F_max and F(t) is less than a predetermined "detected peak width", that is, F(t) is located between F_max and the "detected peak width". If this determination is yes, the process proceeds to step S311. If this determination is no, the process proceeds to step S313.

In step S311, the operation circuit 54 determines whether a value obtained by P(t) from P_max exceeds a predetermined determined peak width, that is, P(t) drops from P_max by more than the determined peak width. If this determination is yes, the process proceeds to step S313. If this determination is no, the process proceeds to step S312.

In step S312, the operation circuit 54 increments the current value of variable t. Then, the process returns to step S305 and the above-mentioned process is repeated.

In step S313, the operation circuit 54 sets the F_max then as a frequency to be applied to the AOTF to transmit the peak of the signal light, and this control process terminates.

By the above-mentioned process, the peak of signal light can be detected without wrong detection due to the side lobes that appear in the wavelength transmission characteristic of an AOTF.

Next, the summary of the tracking control which is performed to maintain a state after channel signal light with a desired wavelength is extracted from a WDM signal included in an input signal by an optical tunable filter that is controlled by the earlier-mentioned various control circuits is described with reference to FIG. 18.

This tracking control optimizes the wavelength transmission characteristic of the optical tunable filter 51, for example, in the circuit shown in FIG. 5, by detecting a change in power of monitor light as an error signal generated when the operation circuit 54 instructs the driving circuit 55 to slightly change the frequency of an RF signal to be applied to the optical tunable filter 51 in correspondence with the wavelength of signal light selected by the optical tunable filter 51, and by feed-back controlling the frequency of the RF signal based on the error signal.

Figure 18:
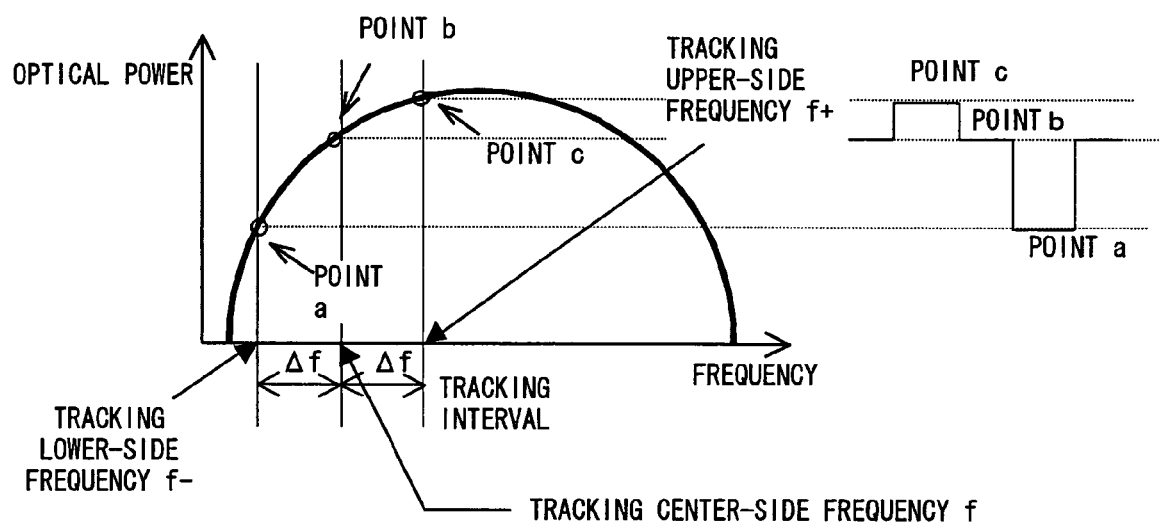
FIG. 18 shows basic tracking control.

If the operation circuit 54 issues an instruction to change (dither) a RF signal to be controlled to the driving circuit 55, the power of monitor light, detected by the light detection unit 53, changes as shown in FIG. 18. When the frequency of the drive signal set at a specific point is f0, this operation to change the frequency of a drive signal is performed by changing it between a frequency f−(=f0−Δf) which is away from frequency f0 by a tracking frequency interval Δf toward the high frequency side and a frequency f+(=f0+Δf) which is away from frequency f0 by a tracking frequency interval Δf toward the low frequency side. In FIG. 18, monitor light power obtained when the frequency of the RF signal is f− corresponds to a point a, monitor light power obtained when the frequency of the RF signal is f0 corresponds to a point b, and monitor light power obtained when the frequency of the RF signal is f+ corresponds to a point c.

In this case, monitor light power at point a and at point c are compared, and the frequency of the RF signal is controlled so that a frequency corresponding to the larger monitor light power of the two becomes a center frequency (above-mentioned f0) for subsequent control. In FIG. 18, since a monitor light power at point c on the high-frequency side is larger than that at point a on the low-frequency side, the frequency at point c, that is, f+, is set as the center frequency f0 for subsequent control.

By repeating the above-mentioned control, the extraction state of signal light with a desired wavelength can be maintained by the optical tunable filter 51.

The application of the present invention is not limited to the above-mentioned preferred embodiments, and a variety of improvements/modifications is possible as long as the subject matter of the present invention is not deviated.

As described above, according to the present invention, when extracting signal light with a desired wavelength from a WDM signal using an optical tunable filter, the optical tunable filter can be controlled so that signal light with a wavelength different from a desired one may not be wrongly extracted.

What is claimed is:

1. An optical communication apparatus, comprising:
   an optical tunable filter, whose wavelength transmission characteristic varies depending on a control signal, transmitting and extracting signal light with a specific wavelength from signal light multiplexed using wavelength-division multiplexing (WDM);
   a detection unit detecting signal light extracted by the optical tunable filter; and
   a control signal generating unit generating the control signal needed to enable the optical tunable filter to extract the signal light with a predetermined wavelength by the detection unit, based on a detected result obtained by scanning a wavelength transmission characteristic of the optical tunable filter for a range of a wavelength band including all of the multiplexed signal light;
   wherein the control signal generating unit determines existence of a signal light where a peak level of a detected light is greater than a given signal light level and a peak point of the detected light at a determined peak width from the peak level of the detected light is less than a predetermined level.

2. The optical communication apparatus according to claim 1, wherein said control signal generating unit generates the control signal needed to extract the signal light with a desired wavelength, based on both the detected result and information indicating a current operating situation of the multiplexed signal light.

3. An optical communication apparatus, comprising:
   an optical tunable filter, whose wavelength transmission characteristic varies depending on a control signal, transmitting and extracting signal light with a specific wavelength from signal light multiplexed using wavelength-division multiplexing (WDM);
   a detection unit detecting signal light extracted by the optical tunable filter;
   an operation unit operating to generate information for designating the control signal needed to enable the optical tunable filter to extract signal light with a designated wavelength, based on a detected result of two signal lights at each edge of the wavelength band obtained by scanning the detection unit when scanning a wavelength transmission characteristic of the optical tunable filter for a range from outside of a wavelength band including all of the multiplexed signal light; and
   a control signal generating unit generating the control signal according to the designation information; and
   wherein the control signal applied to the optical tunable filter for extracting each multiplexed signal light is computed by interpolation operation based on the control signal applied to the optical tunable filter, a wrong extraction of a signal with a different wavelength is avoided when extracting a signal with a desired wavelength, and
   wherein the control signal generating unit determines existence of a signal light where a peak level of a detected light is greater than a given signal light level and a peak point of the detected light at a determined peak width from the peak level of the detected light is less than a predetermined level.

4. The optical communication apparatus according to claim 3, wherein said operation unit executes the computation, based on both the detected result and information indicating a current operating situation of the multiplexed signal light.

5. The optical communication apparatus according to claim 3, wherein when receiving no instruction to extract signal light, said operation unit operates to generate in advance the designation information needed to select and extract one arbitrary segment of signal light from the multiplexed signal light, and when receiving the instruction later, said operation unit operates to generate the control signal needed to extract the designated signal light, based on information obtained up to then.

6. The optical communication apparatus according to claim 3, wherein when an instruction to extract signal light is modified, said operation unit operates to generate the designation information needed to extract modified designated signal light, based on information obtained prior to the reception of the modified instruction.

7. The optical communication apparatus according to claim 3, wherein when determining the existence/non-existence of signal light, based on a detected result of said detection unit, said operation unit sets a reference of the determination, based on a signal level detected by said detection unit when a wavelength transmission characteristic of said optical tunable filter is set so that signal light with a wavelength located outside a wavelength band including all segments of the multiplexed signal light can be transmitted.

8. The optical communication apparatus according to claim 7, wherein when determining the existence/non-existence of signal light, based on a detected result of said detection unit, said operation unit determines a target signal not to be signal light if the size of a target signal level is less than the predetermined value.

9. The optical communication apparatus according to claim 8, wherein said operation unit maintains a maximum signal level of signal light detected by the shift of said detection unit when shifting the wavelength transmission characteristic of said optical tunable filter in a range where the size of a target signal level exceeds the predetermined value, and if said detection unit detects the decrease of a signal level from the maximum value by more than a predetermined value when continuing to scan the wavelength transmission characteristic in a predetermined range after detecting the maximum value, said operation unit regards the control signal generated by said control signal generating unit when detecting the maximum value as an optimal control signal to be applied to said optical tunable filter to extract the signal light, and performs the computation.

10. A method for controlling an optical tunable filter, comprising:
  detecting a signal light extracted by the optical tunable filter with a detection unit, whose wavelength transmission characteristic varies depending on a control signal, transmitting and extracting the signal light with a specific wavelength from signal light multiplexed by wavelength-division multiplexing (WDM); and
  generating the control signal needed to enable the optical tunable filter to extract the signal light with a predetermined wavelength, based on the detected result obtained by scanning the wavelength transmission characteristic of the optical tunable filter in a wavelength band including all segments of the multiplexed signal light and wherein the control signal applied to the optical tunable filter for extracting each multiplexed signal light is known for each signal light by the detected result, wherein
  the control signal generating determines existence of a signal light where a peak level of a detected light is greater than a given signal light level and a peak point of the detected light at a determined peak width from the peak level of the detected light is less than a predetermined level.

11. A method for controlling an optical tunable filter, comprising:
  detecting a signal light extracted by the optical tunable filter with a detection unit, whose wavelength transmission characteristic varies depending on a control signal, transmitting and extracting the signal light with a specific wavelength from signal light multiplexed by wavelength-division multiplexing (WDM);
  generating information for designating the control signal needed to enable the optical tunable filter to extract the signal light with a designated wavelength, based on a detected result of two segments of signal light at each edge of the wavelength band obtained by the detecting result when scanning a wavelength transmission characteristic of the optical tunable filter from outside a wavelength band including all segments of the multiplexed signal light; and
  generating the control signal according to the designation information and wherein the control signal applied to the optical tunable filter for extracting each multiplexed signal light is known for each signal light by the detected result, wherein
  the control signal generating determines existence of a signal light where a peak level of a detected light is greater than a given signal light level and a peak point of the detected light at a determined peak width from the peak level of the detected light is less than a predetermined level.

12. A method for controlling an optical tunable filter, comprising:
  detecting signal light with a specific wavelength of all segments of signal light extracted by the optical tunable filter with a detection unit, whose wavelength transmission characteristic varies depending on a control signal, transmitting and extracting signal light with a specific wavelength from signal light multiplexed by wavelength-division multiplexing (WDM);
  generating information for designating the control signal needed to enable the optical tunable filter to extract the signal light with a predetermined wavelength, based on both the detected result and information indicating a current operating state of the multiplexed signal light; and
  generating the control signal according to the designation information and wherein the control signal applied to the optical tunable filter for extracting each multiplexed signal light is known for each signal light by the detected result, wherein
  the control signal generating determines existence of a signal light where a peak level of a detected light is greater than a given signal light level and a peak point of the detected light at a determined peak width from the peak level of the detected light is less than a predetermined level.

13. An optical communication apparatus, comprising:
  an optical tunable filter, whose wavelength transmission characteristic varies depending on a control signal, transmitting and extracting signal light with a specific wavelength from a signal light multiplexed by wavelength-division multiplexing (WDM);

detection means detecting the signal light extracted by the optical tunable filter; and control signal generating means generating the control signal needed to enable the optical tunable filter to extract the signal light with a predetermined wavelength by the detection means, based on a detected result obtained by scanning a wavelength transmission characteristic of the optical tunable filter in a wavelength band including all segments of the multiplexed signal light and wherein the control signal applied to the optical tunable filter for extracting each multiplexed signal light is known for each signal light by the detected result, and wherein the control signal generating means determines existence of a signal light where a peak level of a detected light is greater than a given signal light level and a peak point of the detected light at a determined peak width from the peak level of the detected light is less than a predetermined level.

14. An optical communication apparatus, comprising:

an optical tunable filter, whose wavelength transmission characteristic varies depending on a control signal, transmitting and extracting signal light with a specific wavelength from a signal light multiplexed by wavelength-division multiplexing (WDM);

detection means detecting the signal light extracted by the optical tunable filter;

operation means operating to generate information for designating the control signal needed to enable the optical tunable filter to extract the signal light with a designated wavelength, based on a detected result of two segments of signal light at each edge of the wavelength band obtained by scanning of the detection means when shifting a wavelength transmission characteristic of the optical tunable filter from outside a wavelength band including all segments of the multiplexed signal light; and control signal generating means generating the control signal according to the designation information and wherein the control signal applied to the optical tunable filter for extracting each multiplexed signal light is known for each signal light by the detected result, and wherein the control signal generating means determines existence of a signal light where a peak level of a detected light is greater than a given signal light level and a peak point of the detected light at a determined peak width from the peak level of the detected light is less than a predetermined level.

15. An optical communication apparatus, comprising:

an optical tunable filter for passing a wavelength division multiplexed light signal and having an adjustable wavelength passing range responsive to a range adjustment signal;

a detector detecting the light signal from the filter; and a control unit producing the adjustment signal adjusting the range of the filter responsive to the light signal detected and a designated wavelength of a wavelength division multiplexed light signal to be extracted and determining existence of the light where a peak level of a detected light is greater than a predetermined signal light level and a peak point of the detected light at a determined peak width from the peak level of the detected light is less than a predetermined peak level, the control unit generating the control signal by using the control signal applied to the optical tunable filter when the detector detects the signal light in scanning of a wavelength transmission characteristic.

16. An optical communication method, comprising:

detecting an output light signal from an optical tunable filter using a detection unit for a wavelength division multiplexed light signal and having an adjustable wavelength passing range responsive to a range adjustment signal where the detecting determining existence of the light where a peak level of a detected light is greater than a predetermined signal light level and a peak point of the detected light at a determined peak width from the peak level of the detected light is less than a predetermined peak level; and producing the adjustment signal using an adjustment signal generating unit adjusting the range of the filter responsive to the detected output light signal and a designated wavelength of a wavelength division multiplexed light signal to be extracted, wherein the adjustment signal generating unit generating the adjustment signal by using the adjustment signal applied to the optical tunable filter when the detection unit detects the light signal in scanning of a wavelength transmission characteristic.

* * * * *